US012779332B2

(12) United States Patent
Osada

(10) Patent No.: US 12,779,332 B2
(45) Date of Patent: *Nov. 3, 2026

(54) COMPUTER-READABLE NON-TRANSITORY STORAGE MEDIUM HAVING GAME PROGRAM STORED THEREIN, GAME APPARATUS, GAME SYSTEM, AND GAME PROCESSING METHOD

(71) Applicant: NINTENDO CO., LTD., Kyoto (JP)

(72) Inventor: Jyunya Osada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 223 days.

This patent is subject to a terminal disclaimer.

(21) Appl. No.: 18/940,977

(22) Filed: Nov. 8, 2024

(65) Prior Publication Data

US 2025/0058223 A1 Feb. 20, 2025

Related U.S. Application Data

(63) Continuation of application No. 17/957,638, filed on Sep. 30, 2022, now Pat. No. 12,172,077.

(30) Foreign Application Priority Data

Oct. 8, 2021 (JP) ................................ 2021-166400

(51) Int. Cl.

| | |
|---|---|
| ***A63F 13/54*** | (2014.01) |
| ***A63F 13/5252*** | (2014.01) |
| ***H04S 7/00*** | (2006.01) |

(52) U.S. Cl.

CPC .......... *A63F 13/54* (2014.09); *A63F 13/5252* (2014.09); *H04S 7/303* (2013.01);

(Continued)

(58) Field of Classification Search

CPC ........ A63F 13/215; A63F 13/50; A63F 13/52; A63F 13/525; A63F 13/5252;

(Continued)

(56) References Cited

U.S. PATENT DOCUMENTS

| | | | |
|---|---|---|---|
| 7,113,610 | B1 | 9/2006 | Chrysanthakopoulos |
| 10,500,495 | B2 | 12/2019 | Gohara |

(Continued)

FOREIGN PATENT DOCUMENTS

| | | |
|---|---|---|
| CN | 113318432 | 8/2021 |
| EP | 2 591 832 | 5/2013 |

(Continued)

OTHER PUBLICATIONS

Feb. 23, 2023 Search Report issued in European Patent Application No. 22199473.4, pp. 1-7.

*Primary Examiner* — Milap Shah

(74) *Attorney, Agent, or Firm* — Nixon & Vanderhye PC

(57) ABSTRACT

When a first condition related to a change in a position of a virtual microphone in a virtual space is satisfied, a residual virtual microphone is placed at a position of the virtual microphone before the change in the position, and residual virtual microphone acquisition sound data whose volume is set on the basis of a distance between the residual virtual microphone and a virtual sound source and current virtual microphone acquisition sound data whose volume is set on the basis of a distance between the virtual microphone after the change in the position and the virtual sound source are outputted to a speaker such that an output level of the residual virtual microphone acquisition sound data is gradually decreased and an output level of the current virtual microphone acquisition sound data is gradually increased.

19 Claims, 21 Drawing Sheets

(52) U.S. Cl.
CPC ................. *A63F 2300/6081* (2013.01); *A63F 2300/6669* (2013.01); *H04S 2400/11* (2013.01); *H04S 2400/13* (2013.01); *H04S 2400/15* (2013.01)

(58) Field of Classification Search
CPC .............. A63F 13/54; A63F 2300/6063; A63F 2300/6072; A63F 2300/6081
See application file for complete search history.

(56) References Cited

U.S. PATENT DOCUMENTS

| | | | | |
|---|---|---|---|---|
| 12,172,077 | B2 * | 12/2024 | Osada ................. | A63F 13/5252 |
| 2002/0094865 | A1 | 7/2002 | Araki et al. | |
| 2004/0110561 | A1 | 6/2004 | Kawamura | |
| 2009/0286600 | A1 | 11/2009 | Hideya | |
| 2013/0120569 | A1 | 5/2013 | Mizuta | |
| 2014/0126754 | A1 | 5/2014 | Mizuta | |
| 2014/0133681 | A1 | 5/2014 | Mizuta | |
| 2020/0162832 | A1 | 5/2020 | Yasuda | |
| 2021/0322880 | A1 | 10/2021 | Baszucki | |

FOREIGN PATENT DOCUMENTS

| | | |
|---|---|---|
| JP | 2000-112485 | 4/2000 |
| JP | 2007-330578 | 12/2007 |
| JP | 2008-244865 | 10/2008 |
| JP | 6147486 | 6/2017 |
| JP | 2018-007227 | 1/2018 |
| JP | 2018-020126 | 2/2018 |
| JP | 2020-028419 | 2/2020 |
| WO | 2016/088306 | 6/2016 |

* cited by examiner

304

| 341 SOUND SOURCE ID | 342 REPRODUCTION SOUND DATA | 343 SOUND SOURCE POSITION-ORIENTATION DATA | 344 SOUND SOURCE GENERATION ID | 345 REPRODUCTION FLAG |
|---|---|---|---|---|
| 1 | ··· | ··· | 01 | ON |
| 2 | ··· | ··· | 01 | ON |
| 3 | ··· | ··· | 02 | ON |
| 4 | ··· | ··· | null | OFF |
| ⋮ | ⋮ | ⋮ | ⋮ | ⋮ |

FIG. 23

305

| MICROPHONE GENERATION ID (351) | RESIDUAL FLAG (352) | SWITCHING FLAG (353) | SWITCHING COMPLETION FLAG (354) | MICROPHONE POSITION-ORIENTATION DATA (355) | OUTPUT LEVEL SPECIFICATION TABLE (356) |
|---|---|---|---|---|---|
| 01 | ON | ON | OFF | ... | ... |
| 02 | OFF | ON | OFF | ... | ... |
| ... | ... | ... | ... | ... | ... |

| SOUND SOURCE GENERATION (357) | OUTPUT LEVEL DATA (358) |
|---|---|
| 01 | 1.0 |
| 02 | 0.0 |
| null | null |
| null | null |

F I G. 3 1

OUTPUT LEVEL MASTER DATA

DATA FOR FIRST GENERATION MICROPHONE

| SOUND SOURCE GENERATION | INITIAL OUTPUT LEVEL |
|---|---|
| 01 | 1.0 |
| 02 | 0.0 |
| ⋮ | ⋮ |

DATA FOR SECOND GENERATION MICROPHONE

| SOUND SOURCE GENERATION | INITIAL OUTPUT LEVEL |
|---|---|
| 01 | 0.0 |
| 02 | 1.0 |
| ⋮ | ⋮ |

⋮

COMPUTER-READABLE NON-TRANSITORY STORAGE MEDIUM HAVING GAME PROGRAM STORED THEREIN, GAME APPARATUS, GAME SYSTEM, AND GAME PROCESSING METHOD

CROSS REFERENCE TO RELATED APPLICATION

This application is a continuation of U.S. patent application Ser. No. 17/957,638 filed Sep. 30, 2022, which claims priority to Japanese Patent Application No. 2021-166400 filed on Oct. 8, 2021, the entire contents of which are incorporated herein by reference.

FIELD

The present disclosure relates to sound control processing of outputting a sound to a speaker.

BACKGROUND AND SUMMARY

Conventionally, a technology for controlling the sound volume, etc., of an output sound on the basis of the distance between a virtual sound source and a virtual microphone in a virtual space, is known.

However, in the above technology, when the relative positional relationship between the virtual microphone and the virtual sound source is abruptly changed, there is a possibility that, for example, an abrupt change for sound output occurs, making a user feel uncomfortable.

Therefore, an object of the present disclosure is to provide a computer-readable non-transitory storage medium having a game program stored therein, a game apparatus, a game system, and a game processing method which are capable of, even when a relative positional relationship between the virtual microphone and the virtual sound source is abruptly changed, reducing a possibility that output of a sound related to the virtual sound source makes a user feel uncomfortable.

In order to attain the object described above, for example, the following configuration examples are exemplified.

A configuration example is directed to a computer-readable non-transitory storage medium having stored therein a game program causing a computer of an information processing apparatus, capable of outputting sound data to a speaker, to: place a virtual sound source with which the sound data is associated, in a virtual space; reproduce the sound data on the basis of game processing; move a virtual microphone in the virtual space on the basis of the game processing; set a volume of virtual microphone acquisition sound data virtually acquired by the virtual microphone from the virtual sound source, on the basis of a distance between the virtual microphone and the virtual sound source; set an output level indicating a degree of output of the virtual microphone acquisition sound data to be outputted to the speaker, to a first output level; and when a first condition related to a change in a position of the virtual microphone in the virtual space is satisfied, place a residual virtual microphone at a position of the virtual microphone before the change in the position, and output residual virtual microphone acquisition sound data whose volume is set on the basis of a distance between the residual virtual microphone and the virtual sound source, and current virtual microphone acquisition sound data whose volume is set on the basis of a distance between the virtual microphone after the change in the position and the virtual sound source, to the speaker such that the output level of the residual virtual microphone acquisition sound data is gradually decreased and the output level of the current virtual microphone acquisition sound data is gradually increased toward the first output level.

According to the above configuration example, the residual virtual microphone is placed at the position of the virtual microphone before movement, and sound output from both virtual microphones to the speaker is performed while output levels are changed so as to crossfade between the virtual microphones at the current position. Accordingly, the sound heard by the user can be gradually switched from the sound acquired by the residual virtual microphone at the position before movement to the sound acquired by the virtual microphone at the current position, so that a possibility that the sound output makes the user feel uncomfortable when the relative positional relationship between the virtual microphone and the virtual sound source abruptly changes can be reduced.

In another configuration example, the first condition may be a condition satisfied when a parameter related to a movement speed of the virtual microphone in the virtual space becomes equal to or greater than a predetermined value.

According to the above configuration example, even when a situation occurs in which the movement speed of the virtual microphone becomes equal to or greater than the predetermined value and the positional relationship between the virtual microphone and the virtual sound source abruptly changes, an abrupt change of the sound output can be alleviated.

In another configuration example, the virtual microphone may be placed in association with a position and/or an orientation of the virtual camera, and the first condition may be a condition satisfied when the parameter related to the movement speed of the virtual microphone becomes equal to or greater than the predetermined value or a parameter related to a change speed of the orientation of the virtual camera becomes equal to or greater than a predetermined value.

According to the above configuration example, for example, even when the direction of the virtual camera instantaneously changes by 180 degrees, the orientation of the virtual microphone also changes accordingly, and as a result, the positions of the virtual microphone and the sound source are laterally interchanged with each other, and an abrupt change of the sound output can be alleviated.

In another configuration example, the virtual microphone may be placed in association with a position and/or an orientation of the virtual camera, a first virtual camera which is used for reproducing a predetermined scene in which movement of the virtual camera is automatically controlled, and a second virtual camera which is normally used other than for the predetermined scene and whose movement is controlled on the basis of an operation of a user or movement of a player character object may be used in the game processing, and when the virtual camera used for generating a game image to be displayed is switched from the second virtual camera to the first virtual camera, the first condition may be satisfied.

According to the above configuration example, for example, even when an abrupt change in the position of the virtual camera due to start of an event scene from a normal game screen occurs, an abrupt change of the sound output can be alleviated.

In another configuration example, the virtual microphone may be placed in association with a position and/or an orientation of the virtual camera, and the first condition may be a condition satisfied when a predetermined scene in which the virtual camera automatically moves is being reproduced and a preset timing when the virtual camera moves in the virtual space by a predetermined distance at a predetermined speed or more has come.

According to the above configuration example, for example, even when camera movement in which the position of the virtual camera abruptly changes is used in an event scene in which the position of the virtual camera is automatically controlled, an abrupt change of the sound output can be alleviated.

In another configuration example, the output level of the residual virtual microphone acquisition sound data may be gradually decreased from the first output level.

According to the above configuration example, the volume is gradually decreased from the volume based on the first output level. Accordingly, an abrupt change of the sound output can be suppressed.

In another configuration example, when the first condition is satisfied, a sound of a past sound source which is a sound source whose reproduction is performed before the first condition is satisfied may be outputted to the speaker such that the output level of the residual virtual microphone acquisition sound data is gradually decreased and the output level of the current virtual microphone acquisition sound data is gradually increased toward the first output level, and a sound of a current sound source which is a sound source whose reproduction is started after the first condition is satisfied may be outputted to the speaker such that the output level of the current virtual microphone acquisition sound data is not changed from the first output level.

According to the above configuration example, as for the sound of the sound source whose reproduction is performed before the first condition is satisfied, an abrupt change of the sound output can be suppressed, and as for the sound of the sound source whose reproduction is started after the first condition is satisfied, the appearance of the game image seen on the screen and the manner in which the sound is heard can be matched, and the user can be prevented from being made to feel uncomfortable.

In another configuration example, a sound acquired from the current sound source by the residual virtual microphone may not necessarily be outputted to the speaker, or the residual virtual microphone may not necessarily be caused to acquire a sound from the current sound source.

According to the above configuration example, the process related to the residual microphone for the current sound source can be substantially prevented from being executed, so that the processing load can be reduced.

In another configuration example, a time from start of a process of outputting the residual virtual microphone acquisition sound data and the current virtual microphone acquisition sound data to the speaker while changing the output level of the residual virtual microphone acquisition sound data and the output level of the current virtual microphone acquisition sound data such that the output level of the residual virtual microphone acquisition sound data is gradually decreased and the output level of the current virtual microphone acquisition sound data is gradually increased toward the first output level, to completion of the process by the output level of the current virtual microphone acquisition sound data reaching the first output level, may be a time in a range of 0.1 seconds to 0.8 seconds.

According to the above configuration example, an abrupt change of the sound output can be alleviated without unnecessarily increasing the processing load.

In another configuration example, the residual virtual microphone acquisition sound data may be outputted such that the output level of the residual virtual microphone acquisition sound data is gradually decreased from a volume of a sound set on the basis of a distance between the virtual microphone and the virtual sound source when the first condition is satisfied.

According to the above configuration example, regardless of whether the positional relationship between the virtual microphone and the virtual sound source changes after the first condition is satisfied, the sound output is controlled on the basis of the volume based on the positional relationship between the virtual microphone and the virtual sound source when the first condition is satisfied. Accordingly, the process of reflecting a change in positional relationship can be omitted, so that the processing load can be reduced.

In another configuration example, the game program may cause the computer to change the output level of the residual virtual microphone acquisition sound data and the output level of the current virtual microphone acquisition sound data such that the output level of the current virtual microphone acquisition sound data is increased by an amount by which the output level of the residual virtual microphone acquisition sound data is decreased, when changing the output level of the residual virtual microphone acquisition sound data and the output level of the current virtual microphone acquisition sound data such that the output level of the residual virtual microphone acquisition sound data is gradually decreased and the output level of the current virtual microphone acquisition sound data is gradually increased toward the first output level.

According to the above configuration example, the sound can be heard at a constant volume in the user's auditory sense, so that the user can be prevented from being made to feel uncomfortable.

In another configuration example, the game program may cause the computer to delete or disable the residual virtual microphone after the output level of the residual virtual microphone acquisition sound data reaches a minimum value or 0 as a result of the output level of the residual virtual microphone acquisition sound data being changed so as to be gradually decreased.

According to the above configuration example, by deleting or disabling the residual virtual microphone, the number of virtual microphones that are to be processing targets can be reduced, so that the processing load can be reduced.

According to the present disclosure, when the relative positional relationship between the virtual microphone and the virtual sound source abruptly changes, an abrupt change of the sound output can be alleviated.

BRIEF DESCRIPTION OF THE DRAWINGS

FIG. 23 illustrates a non-limiting example of the data structure of virtual microphone data 305;

FIG. 31 illustrates a non-limiting example of the data structure of output level master data.

DETAILED DESCRIPTION OF NON-LIMITING EXAMPLE EMBODIMENTS

Hereinafter, an exemplary embodiment will be described. It is to be understood that, as used herein, elements and the like written in singular form with a word "a" or "an" attached before them do not exclude those in the plural form.

[Hardware Configuration of Information Processing Apparatus]

First, an information processing apparatus for executing information processing according to the exemplary embodiment will be described. The information processing apparatus is, for example, a smartphone, a stationary or hand-held game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus.

Figure 1:
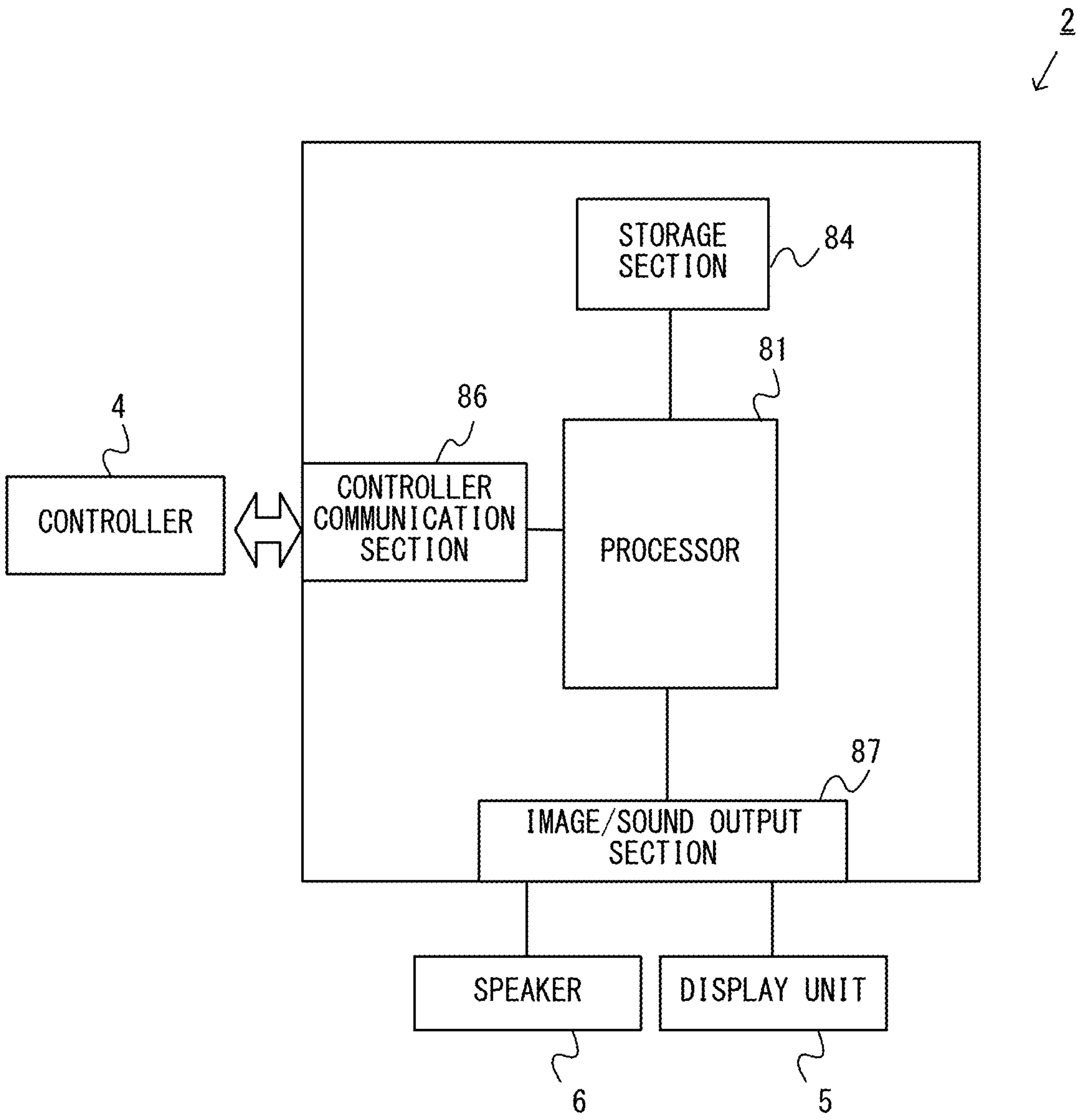
FIG. 1 is a block diagram showing a non-limiting example of the internal configuration of a game apparatus 2.

FIG. 1 is a block diagram showing an example of the internal configuration of a game apparatus 2 according to the exemplary embodiment. The game apparatus 2 includes a processor 81. The processor 81 is an information processing section for executing various types of information processing to be executed by the game apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section 84. The storage section 84 may be, for example, an internal storage medium such as a flash memory and a dynamic random access memory (DRAM), or may be configured to utilize an external storage medium mounted to a slot that is not shown, or the like.

The game apparatus 2 also includes a controller communication section 86 for the game apparatus 2 to perform wired or wireless communication with a controller 4. Although not shown, the controller 4 is provided with various buttons such as a cross key and A, B, X, and Y buttons, an analog stick, etc.

Moreover, a display unit 5 (for example, a liquid crystal monitor, or the like) and a speaker 6 are connected to the game apparatus 2 via an image/sound output section 87. The processor 81 outputs an image generated (for example, by executing the above information processing) to the display unit 5 via the image/sound output section 87. In addition, the processor 81 outputs a generated sound (signal) to the speaker 6 via the image/sound output section 87.

[Outline of Game Processing in Exemplary Embodiment]

Figure 2:
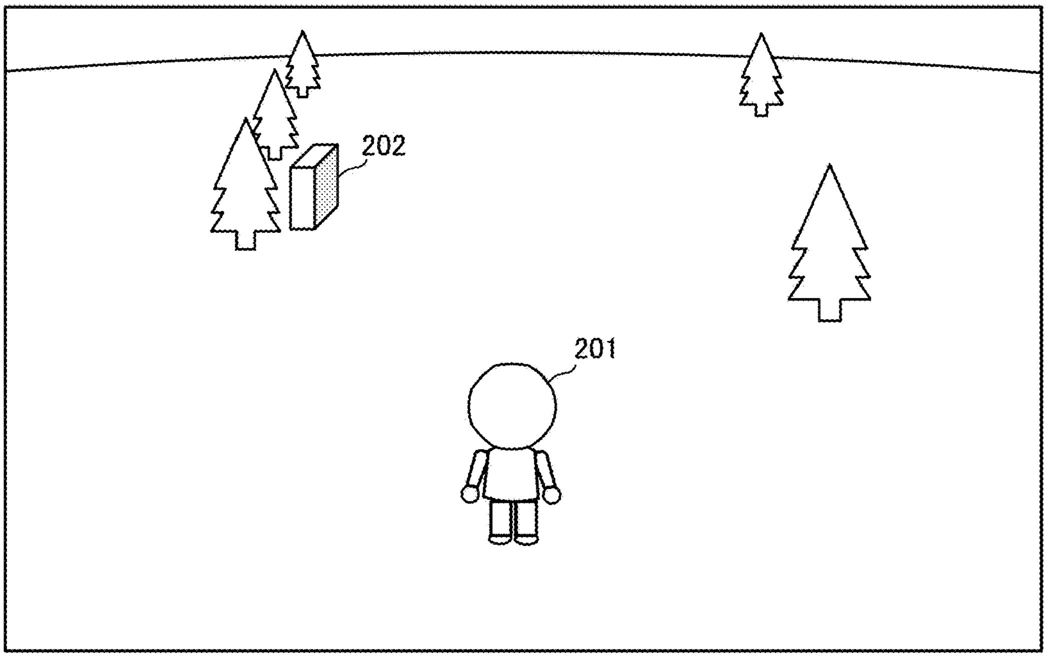
FIG. 2 illustrates a non-limiting example of a game screen according to an exemplary embodiment.
Figure 3:
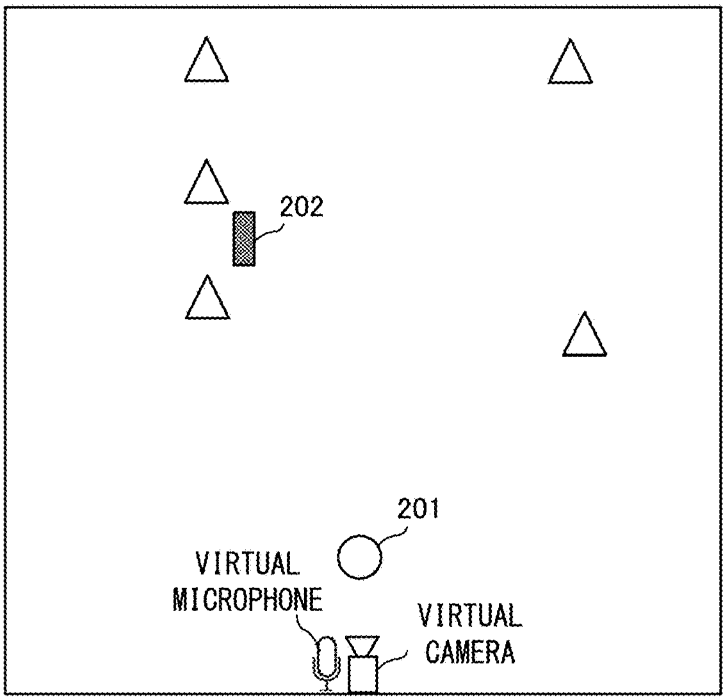
FIG. 3 is a schematic overhead view of a non-limiting example of a virtual game space.

Next, an outline of operation of game processing (an example of the information processing) executed by the game apparatus 2 according to the exemplary embodiment will be described. First, a game assumed in the exemplary embodiment is a game in which a player character object (hereinafter, referred to as a player character) is operated in a virtual three-dimensional game space (hereinafter, referred to as a virtual game space). FIG. 2 illustrates an example of a game screen according to this game. In addition, FIG. 3 is a schematic overhead view of the virtual game space, showing a positional relationship between a virtual camera and a player character 201. In FIG. 2, the player character 201 and a sound source object (hereinafter, simply referred to as a sound source) 202 are displayed. In addition, some tree objects are also displayed. This game basically proceeds in a third-person-view screen. Therefore, the position and the angle of view of the virtual camera are set such that the entirety of the player character 201 is captured as shown in FIG. 2. In addition, the virtual camera is basically controlled so as to follow the position of the player character 201 moving on the basis of an operation of a user. In the exemplary embodiment, the number of virtual cameras is only one.

Moreover, a virtual microphone (sometimes referred to as a listener) is also placed at the same position as the virtual camera. The virtual microphone is used to acquire a sound emitted from the sound source 202 which is placed in the virtual game space, and output the sound as a sound signal to a speaker (after a predetermined sound-related process is performed). In FIG. 3, the virtual microphone and the virtual camera are shown side by side for clarity, but in reality, the positions of the virtual camera and the virtual microphone overlap each other.

Here, in this game which basically proceeds in a third-person-view screen, when a predetermined condition is satisfied, the position of the virtual camera may change instantaneously and considerably (by a predetermined distance or more). In other words, a parameter related to the movement speed of the virtual camera may become equal to or greater than a predetermined value. For example, in this game, the current state may transition from a state where the user operates the player character 201, to an "event demonstration scene" when a predetermined in-game condition is satisfied. The event demonstration scene refers to a scene presented as an "event" to the user, in which movements of the player character 201, non-player characters (hereinafter, referred to as NPCs), and the virtual camera are automatically controlled according to pre-defined movement contents, respectively. Here, in a broad sense, examples of the event demonstration scene may include a scene in which a pre-generated 2D or 3D movie is reproduced. The event demonstration scene in the following description is not a scene in which such a movie is reproduced, but refers to a scene that involves automatic control of each character and the virtual camera as described above, etc. In other words, the presentation to the user of a scene with such automatic control can be said to be reproduction of the event demonstration scene (based on event data that defines the contents of automatic control). In addition, the sound source 202 can also be automatically controlled during reproduction of the event demonstration scene, and thus sound reproduction control of the sound source 202 during the event demonstration scene corresponds to reproduction of a sound based on game processing.

Figure 4:
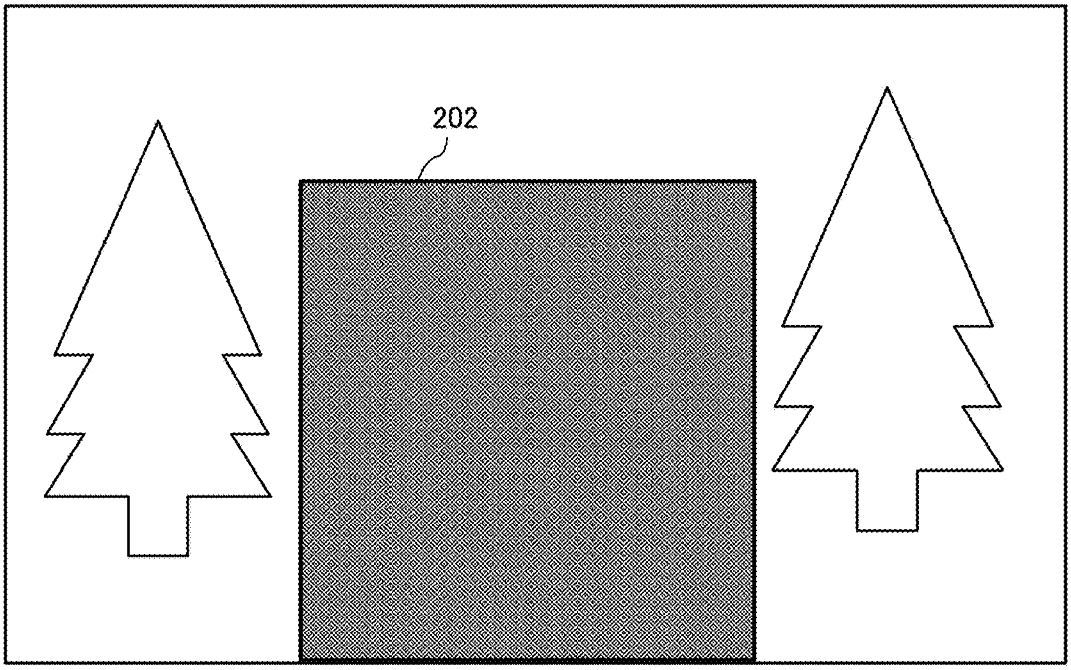
FIG. 4 illustrates a non-limiting example of the game screen according to the exemplary embodiment.
Figure 5:
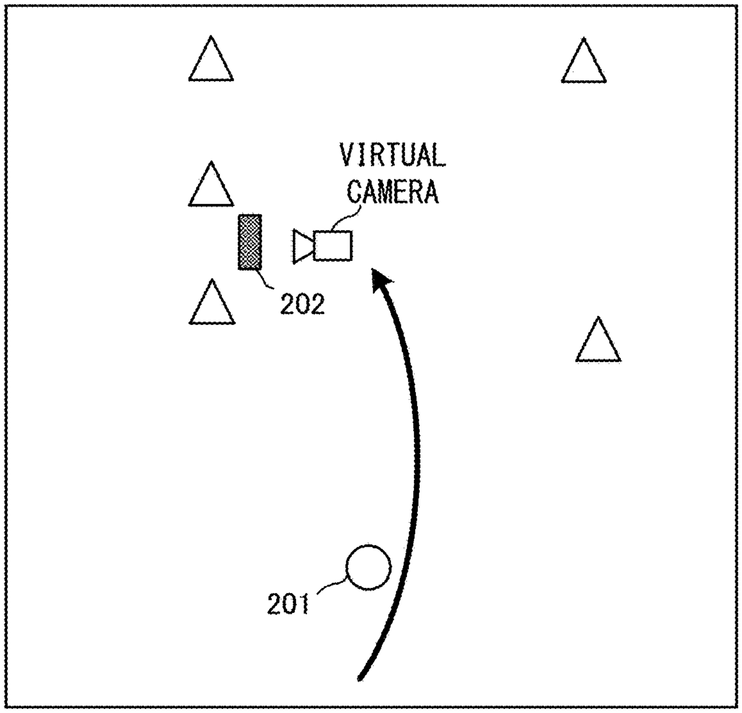
FIG. 5 is a schematic overhead view of a non-limiting example of the virtual game space.

During reproduction of the above event demonstration scene, since the movement of each character is automatically controlled as described above, the current state is a state where an operation for moving the player character 201 is not accepted. In addition, the position and the angle of view (that is, the camera movement and cutting in the event demonstration scene) of the virtual camera are also controlled on the basis of the position and the angle of view specified in advance according to the event demonstration scene. For example, when a predetermined condition (hereinafter, referred to as an event start condition) for starting the event demonstration scene (for example, related to the sound source 202) is satisfied from the state in FIG. 2, the screen may instantaneously switch to a screen showing a close-up of the sound source 202 as shown in FIG. 4. This is an example of the case where a position near the sound source 202 is specified in advance as the position of the virtual camera at the start of the event demonstration scene as shown in FIG. 5 (therefore, the result is as if the virtual camera had instantaneously moved by a predetermined distance or more). After this, during the event demonstration scene, the control of the virtual camera is based on predetermined control contents. Therefore, as a part of the camera movement in the event demonstration scene, similar to the above, the position of the virtual camera may also change instantaneously and considerably. In addition, once the event demonstration scene ends, the screen returns to the game screen of the original viewpoint.

Moreover, as another example in which the position of the virtual camera changes instantaneously and considerably, other than one regarding the event demonstration scene described above, the case where the player character 201 moves at a speed higher than the movement speed at the time of normal movement in some way is conceivable. For example, the case where the player character 201 has used a specific item, the case where the player character 201 has used a specific skill or command, etc., are conceivable. In addition to the above, the case where a predetermined condition for the player character 201 to move at a high speed in the game, etc., are also conceivable. As a result of the virtual camera following the high-speed movement of the player character 201, the position of the virtual camera may change instantaneously and considerably. In addition, for example, the case where the position of the virtual camera changes instantaneously and considerably due to a gimmick of "warp" provided in the virtual game space, is also conceivable. Such a warp gimmick is a gimmick that instantaneously moves the position of the player character 201 to a position that is away therefrom by a predetermined distance or more. For example, when the player character 201 comes into contact with a warp gimmick placed at a first point, the player character 201 can instantaneously move to a second point that is away therefrom by a predetermined distance or more. In this case as well, as a result of moving the virtual camera so as to follow the position of the player character 201, the virtual camera also moves from the first point to the second point, so that the position of the virtual camera may change instantaneously and considerably.

Figure 6:
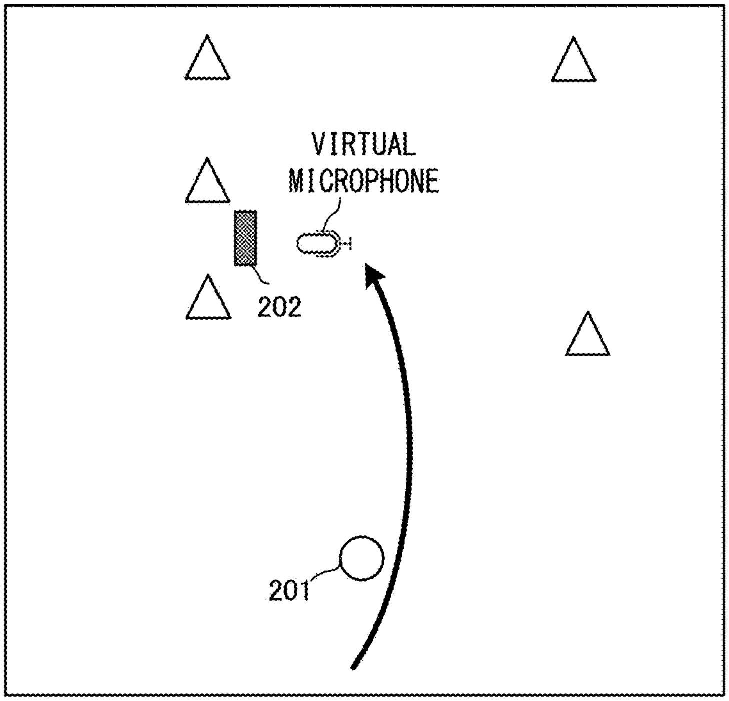
FIG. 6 is a schematic overhead view of a non-limiting example of the virtual game space.

As described above, during the game, the position of the virtual camera may change instantaneously and considerably. Hereafter, such an instantaneous change in the position of the virtual camera by the predetermined distance or more is referred to as an "instantaneous change in camera position". Here, in the exemplary embodiment, the virtual microphone is set at the same position as the virtual camera as described above. Therefore, focusing on the positional relationship between the sound source 202 and the virtual camera and the virtual microphone, the positional relationship between the virtual microphone and the sound source 202 may change instantaneously and considerably with an instantaneous change in camera position as described above. In other words, a parameter related to the movement speed of the virtual microphone may become equal to or greater than a predetermined value. For example, when an instantaneous change in camera position along with the start of the event demonstration scene shown in FIG. 4 occurs, the position of the virtual camera instantaneously changes to a position near the sound source 202 as shown in FIG. 5. Accordingly, as a result of following the position of the virtual camera, the position of the virtual microphone also instantaneously changes to a position near the sound source 202 as shown in FIG. 6. That is, the parameter related to the movement speed of the virtual microphone may change (temporarily) to a predetermined value or more. In such a case, for example, when the positional relationship between the virtual microphone and the sound source 202 is compared between FIG. 3 and FIG. 6, the positional relationship (for example, linear distance therebetween) changes instantaneously and considerably. Hereafter, such an instantaneous change in the position of the virtual microphone by a predetermined distance or more is referred to as an "instantaneous change in microphone position".

Here, the case where the above instantaneous change in camera position occurs while a predetermined sound is being reproduced from the sound source 202, is assumed. In this case, when the virtual microphone is also caused to follow the virtual camera and the positional relationship between the virtual microphone and the sound source 202 is instantaneously changed, the following problem may arise regarding the manner in which the sound from the sound source 202 is heard. First, the volume of the sound reproduced from the sound source 202 may abruptly change, which may cause the sound to be heard like noise. In addition, when a process of applying a so-called Doppler effect is performed as a sound effect process, it is also considered that the Doppler effect may be excessively applied, which may change the pitch of the sound source 202 for worse.

One possible solution to the above problem is to cause the virtual microphone to follow the virtual camera not immediately but with a slight delay, even if the position of the virtual camera changes instantaneously and considerably. Specifically, the virtual microphone is caused to follow the virtual camera not instantaneously but after a short time period (i.e., with a slight delay) while the position of the virtual camera before and after the change is interpolated. However, in this case, control in which the virtual microphone slowly follows the virtual camera is performed, so that there is a possibility that the appearance of the game image does not match the manner in which the sound (the volume thereof) is heard, which may make the user feel uncomfortable. For example, when the sound source 202 that has not been seen so far appears in the screen as a result of an instantaneous change in camera position, a situation in which, even though the sound source 202 is seen, the sound of the sound source 202 cannot be heard, may occur. For example, when the sound source 202 that has been seen at a distance is changed such that the sound source 202 is seen closer, a situation in which, even though the sound source 202 is seen nearby, the volume of the sound of the sound source 202 is unnaturally low (the sound is heard such that the sound is emitted at a distance) may occur. Conversely, a situation in which the sound of the sound source 202 that is no longer seen in the screen as a result of an instantaneous change in camera position is heard, or the sound of the sound source 202 that is seen at a distance is heard at such a volume as if the sound is emitted nearby, may occur.

Figure 7:
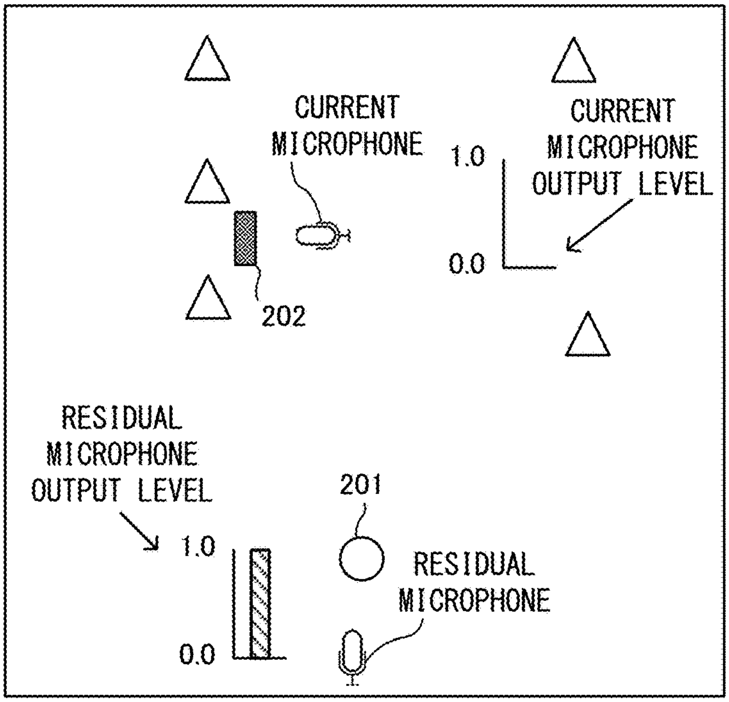
FIG. 7 is a non-limiting example diagram for describing the principle of processing of the exemplary embodiment.

In order to deal with the above problems regarding the manner in which the sound is heard, the following control is performed in the exemplary embodiment. First, in the exemplary embodiment, since the virtual microphone is set at the same position as the position of the virtual camera, the timing of the occurrence of an instantaneous change in camera position and the timing of the occurrence of an instantaneous change in microphone position are substantially the same. When an instantaneous change in microphone position along with an instantaneous change in camera position occurs as described above, a plurality of (two in this example) virtual microphones are temporarily set. Specifically, a virtual microphone after the instantaneous change in microphone position is referred to as "current microphone" (in other words, it can be said that the position of the current microphone is changed instantaneously). Next, a virtual microphone is newly generated at the position of the virtual microphone immediately before the instantaneous change in microphone position occurs, and this virtual microphone is referred to as a "residual microphone". As a result, as shown in FIG. 7, as the virtual microphones, two virtual microphones, that is, the "current microphone" and the "residual microphone", exist temporarily. As for a sound output signal to the speaker 6, while the two virtual microphones exist, a sound signal obtained by combining output from the current microphone to the speaker 6 and output from the residual microphone to the speaker 6 is outputted as a game sound to the speaker 6.

Furthermore, in the exemplary embodiment, a parameter called "output level" is set for each virtual microphone. In the exemplary embodiment, this parameter is a parameter indicating the degree of output when the virtual microphone outputs a sound acquired from the sound source 202, to the speaker 6. In other words, the parameter is a parameter that specifies the ratio of input to the virtual microphone (from a predetermined sound source) and output to the speaker 6. In the exemplary embodiment, the output level is specified in the range of "0.0" to "1.0". If the output level is "1.0", the sound inputted to the virtual microphone (the volume of the sound acquired by the virtual microphone) is outputted to the speaker 6 at 100% output. If the output level is "0.0", the sound inputted to the virtual microphone is not outputted to the speaker 6 (0% output).

In the exemplary embodiment, a process of switching (a main target of sound processing) from the residual microphone to the current microphone over a predetermined period of time is performed. Hereinafter, such switching of the virtual microphone is referred to as microphone switching (as described later, in the exemplary embodiment, microphone switching is completed in 0.3 seconds). Specifically, the output levels of the residual microphone and the current microphone are changed so as to crossfade over time. In the exemplary embodiment, the output level of the residual microphone is changed so as to fade out from "1.0" to "0.0", and the output level of the current microphone is changed so as to fade in from "0.0" to "1.0". Then, when the microphone switching is completed, the residual microphone is deleted.

One example of control will be described with reference to the drawings. First, FIG. 7 shows a state immediately after an instantaneous change in microphone position occurs. In this state, the output level of the residual microphone is set to "1.0", and the output level of the current microphone is set to "0.0". In this state, only the sound of the sound source 202 acquired by the residual microphone can be outputted to the speaker 6.

Figure 8:
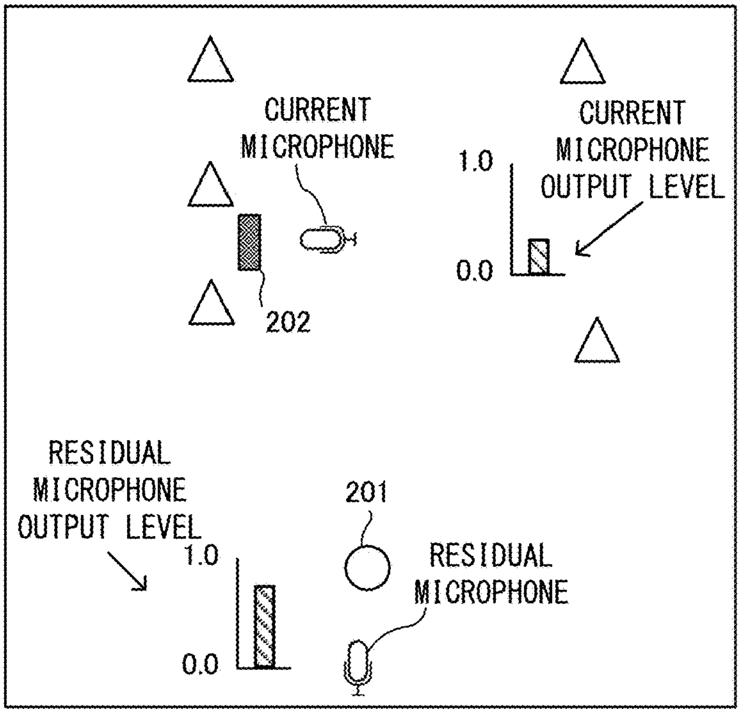
FIG. 8 is a non-limiting example diagram for describing the principle of processing of the exemplary embodiment.

After that, the output level of each virtual microphone changes over time. For example, FIG. 8 shows a state after 0.1 seconds from the occurrence of the instantaneous change in microphone position. FIG. 8 shows a state where the output level of the residual microphone has faded out to "0.7" and the output level of the current microphone has faded in to "0.3". In this state, the sound of the sound source 202 acquired by the residual microphone is outputted at a volume (intensity) that is 70% of the volume (intensity) at the time when the sound is acquired, and the sound of the sound source 202 acquired by the current microphone is outputted at a volume that is 30% of the volume at the time when the sound is acquired. Then, the sound actually outputted from the speaker 6 is a sound obtained by combining the output of the current microphone and the output of the residual microphone.

Figure 9:
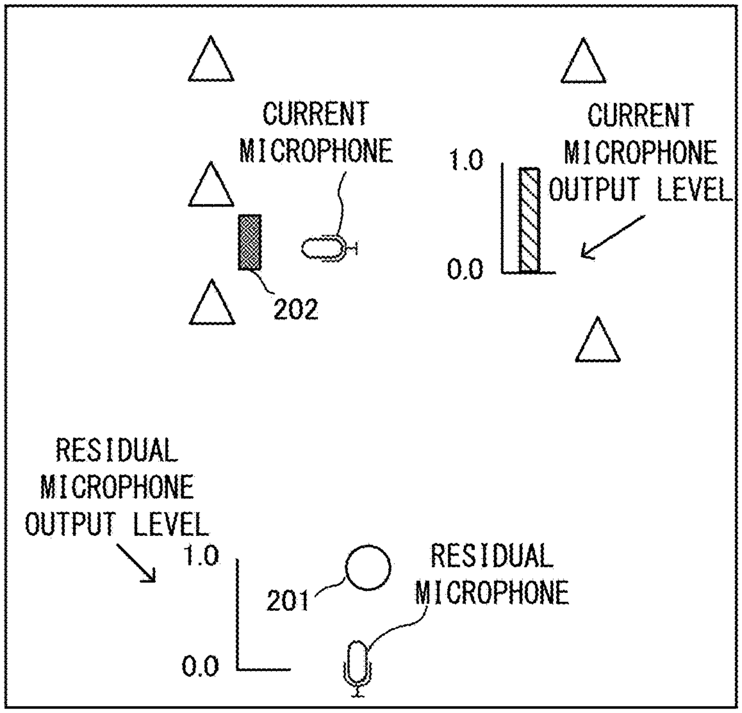
FIG. 9 is a non-limiting example diagram for describing the principle of processing of the exemplary embodiment.
Figure 10:
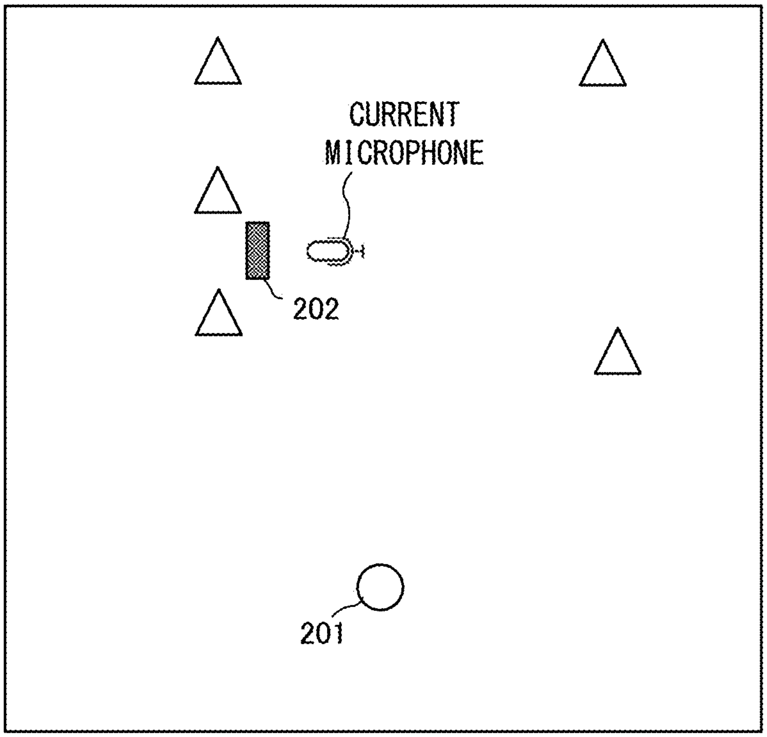
FIG. 10 is a non-limiting example diagram for describing the principle of processing of the exemplary embodiment.

Furthermore, after 0.3 seconds from the occurrence of the instantaneous change in microphone position, the output level is as shown in FIG. 9. In FIG. 9, the output level of the residual microphone is "0.0" as a result of further fading-out. In addition, the output level of the current microphone is "1.0" as a result of further fading-in. In this state, only the sound of the sound source 202 acquired by the current microphone is outputted to the speaker 6. In such a state, the residual microphone whose output level has reached "0.0" is deleted. Accordingly, as shown in FIG. 10, only the current microphone exists as the virtual microphone, and the microphone switching is completed. Thereafter, sound output control using only the current microphone is performed (until the next instantaneous change in microphone position occurs).

Here, in the exemplary embodiment, as described above, the microphone switching is completed in 0.3 seconds. This is the time that takes into consideration the balance between the sound actually heard by the user and the processing load. As described above, in the microphone switching, the number of temporary virtual microphones is increased, and processing is required for a plurality of virtual microphones, which temporarily increases the processing load. Therefore, it is basically preferable if the time for the microphone switching is shorter. On the other hand, if this time is excessively short, the outputted sound may be heard so as to be choppy or noisy. When the time that does not make the user uncomfortable about the manner in which the sound is heard is examined in consideration of the balance between both, it is conceivable to complete the microphone switching within a range of about 0.1 to 0.8 seconds. Therefore, in the exemplary embodiment, as an example, the case of completing the microphone switching in 0.3 seconds is used as an example.

Moreover, as for the changes in the output levels over time, in the exemplary embodiment, one output level is increased by an amount by which the other output level is decreased, and the output levels are changed such that the total of the output levels is constant. For example, in the example in FIG. 8, the output level of the current microphone is increased by an amount (0.3) by which the output level of the residual microphone is decreased from "1.0" to "0.7". Accordingly, the user's auditory sound volume can be kept constant, and the user can be prevented from being made to feel uncomfortable.

Figure 11:
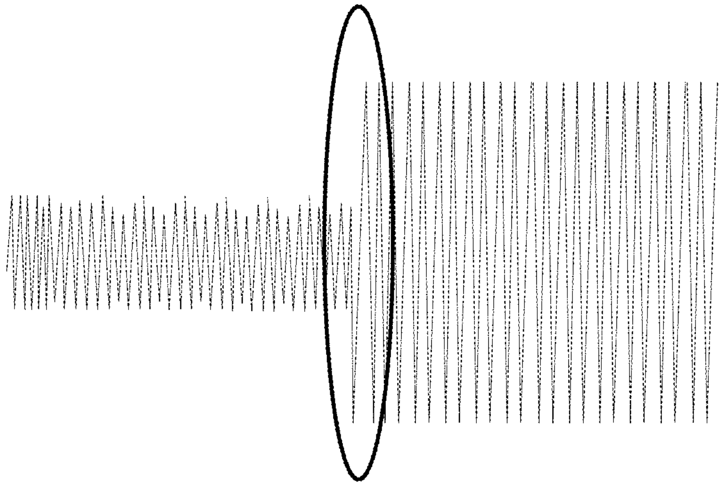
FIG. 11 is a schematic diagram showing a non-limiting example of a change in output sound in waveform.
Figure 12:
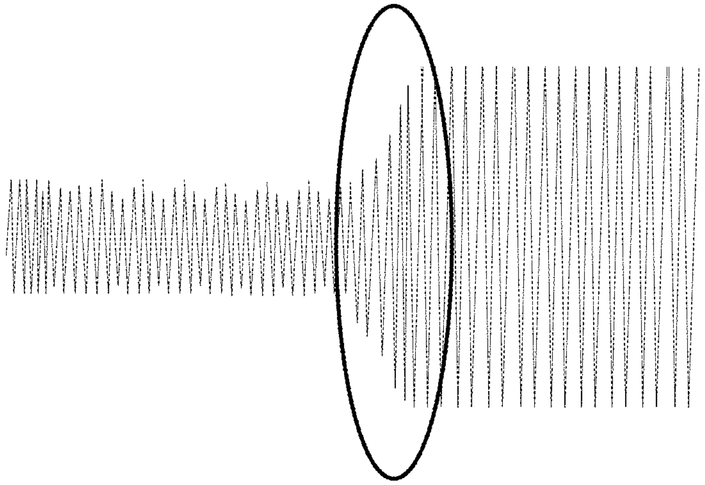
FIG. 12 is a schematic diagram showing a non-limiting example of a change in output sound in waveform.

As described above, in the exemplary embodiment, when an instantaneous change in microphone position occurs, a plurality of virtual microphones are temporarily provided, and the above-described microphone switching process is performed, whereby an abrupt change in the outputted sound can be suppressed. For example, FIG. 11 is a schematic diagram showing a change in output sound in waveform when the microphone switching process as in the exemplary embodiment is not performed and the virtual microphone is simply instantaneously moved along with an instantaneous change in camera position. This is the case where the sound source 202 that has been present at a distance before the movement is changed to a state of being positioned nearby after the movement. In addition, FIG. 12 is a schematic diagram showing a change in output sound in waveform when the microphone switching process as in the exemplary embodiment is performed. When the virtual microphone is instantaneously moved, a waveform in which the degree of inclination abruptly changes is formed as shown in FIG. 11 (especially, change within an ellipse). However, when the microphone switching process as in the exemplary embodiment is performed, the waveform changes gently as shown in FIG. 12 (especially, change within an ellipse). Accordingly, the possibility that the sound is heard like noise can be reduced, and the sense of mismatch between the appearance of the game screen and the heard sound for the user can be suppressed.

Meanwhile, for easy understanding of the description, the example in which there is only one sound source 202 has been described above. In actual game processing, it is considered that there are a plurality of sound sources 202, and the timings at which reproduction of sounds from the respective sound sources 202 is started are different from each other. For example, a situation, in which a sound A whose reproduction continues before an instantaneous change in microphone position occurs and a sound B whose reproduction is started after the instantaneous change in microphone position are mixed together, is also considered. Also assuming such a case, in the exemplary embodiment, in the above-described microphone switching, a process of assigning and managing "generation" for the virtual microphone and each sound source 202 is furthermore performed. Hereinafter, an outline of the processing using this "generation" will be described.

Figure 13:
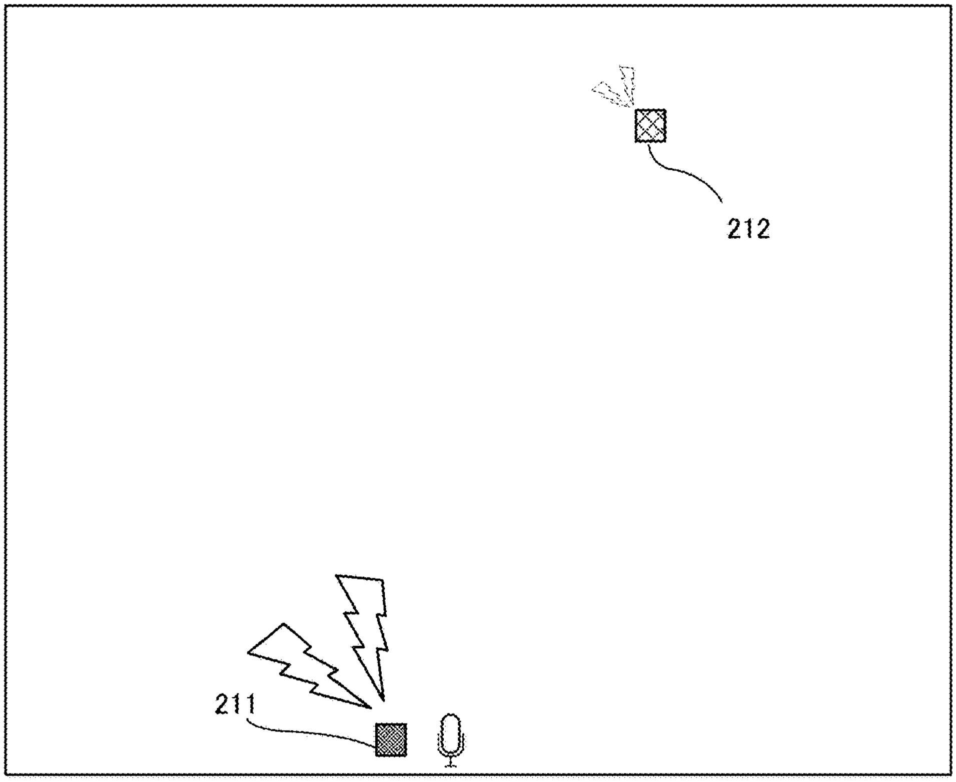
FIG. 13 is a non-limiting example diagram for describing the principle of processing of the exemplary embodiment.

First, the necessity of such a process using the "generation" (situation in which such a process is needed) will be described. FIG. 13 is a schematic (overhead) view of one example of a game space in a state before an instantaneous change in microphone position occurs. In FIG. 13, a first sound source 211 and a second sound source 212 exist, and a state where a predetermined sound is reproduced from each sound source is shown. The volumes of the sounds reproduced from both sound sources are the same. In addition, the virtual microphone is placed near the first sound source 211. Although not shown, the virtual camera is placed at the same position as the virtual microphone. According to the positional relationship between the virtual microphone and each sound source in this state, a state where, at the position of the virtual microphone, the sound of the first sound source 211 is heard louder and the sound of the second sound source 212 is heard relatively quiet, is assumed. Lightning bolt-like symbols near each sound source in FIG. 13 indicate, by their sizes, the loudness of the sound that would be heard by the virtual microphone.

Figure 14:
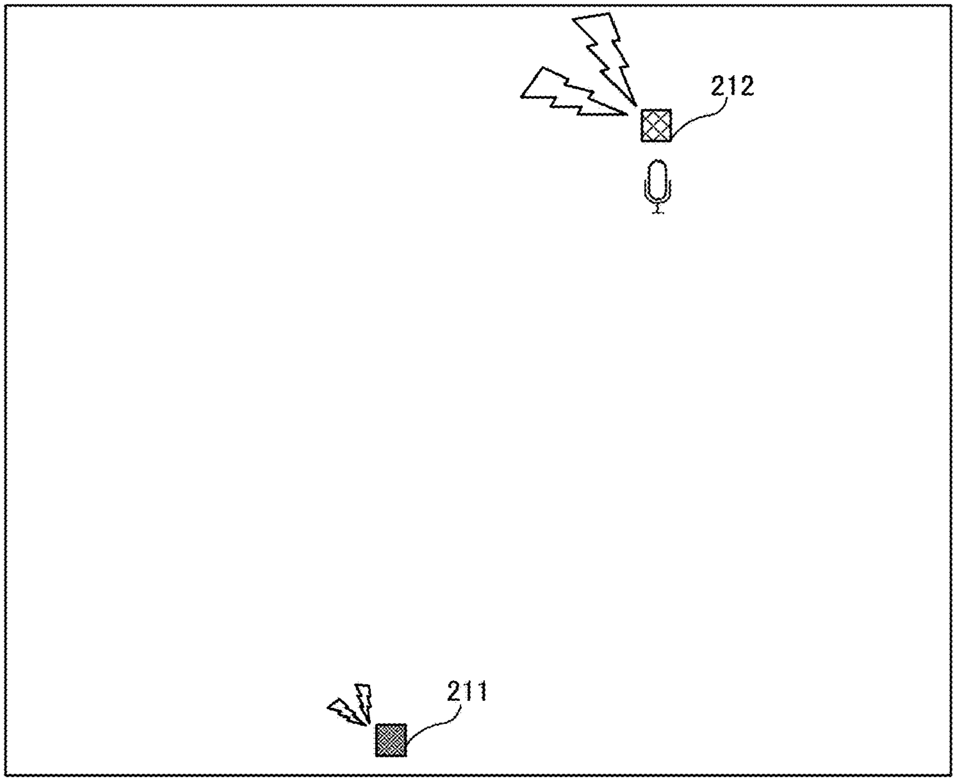
FIG. 14 is a non-limiting example diagram for describing the principle of processing of the exemplary embodiment.

Next, FIG. 14 illustrates an example of a game space in a state immediately after the instantaneous change in microphone position occurs. In addition, here, for easy understanding of the description, a description will be given assuming the case where the above-described microphone switching process is not performed and the virtual microphone is simply moved to the position of the virtual camera. In the state in FIG. 14, the virtual microphone is positioned near the second sound source 212. In such a positional relationship, as for the manner in which the sound from each sound source is heard at the position of the virtual microphone, a state where the sound of the first sound source 211 is heard quiet and the sound of the second sound source 212 is heard loud, is assumed. That is, when a change in positional relationship from FIG. 13 to FIG. 14 occurs, the following change is expected as a change in the volume of the sound of each sound source before and after the instantaneous change in microphone position. Specifically, the volume of the sound of the first sound source 211 is expected to change from loud to quiet, and the volume of the sound of the second sound source 212 is expected to change from quiet to loud. Then, in such a change in sound volume, in order to change the sound volume such that the sound does not become noise, in the exemplary embodiment, the microphone switching process in which the output levels of the two virtual microphones are crossfaded is performed as described above.

Figure 15:
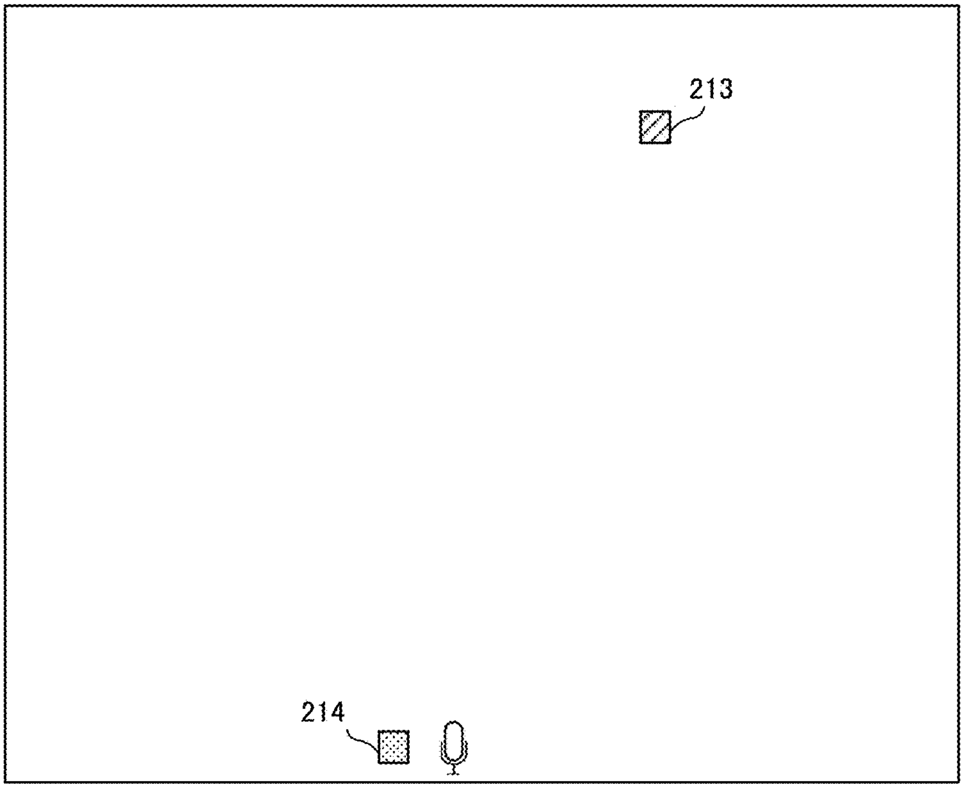
FIG. 15 is a non-limiting example diagram for describing the principle of processing of the exemplary embodiment.
Figure 16:
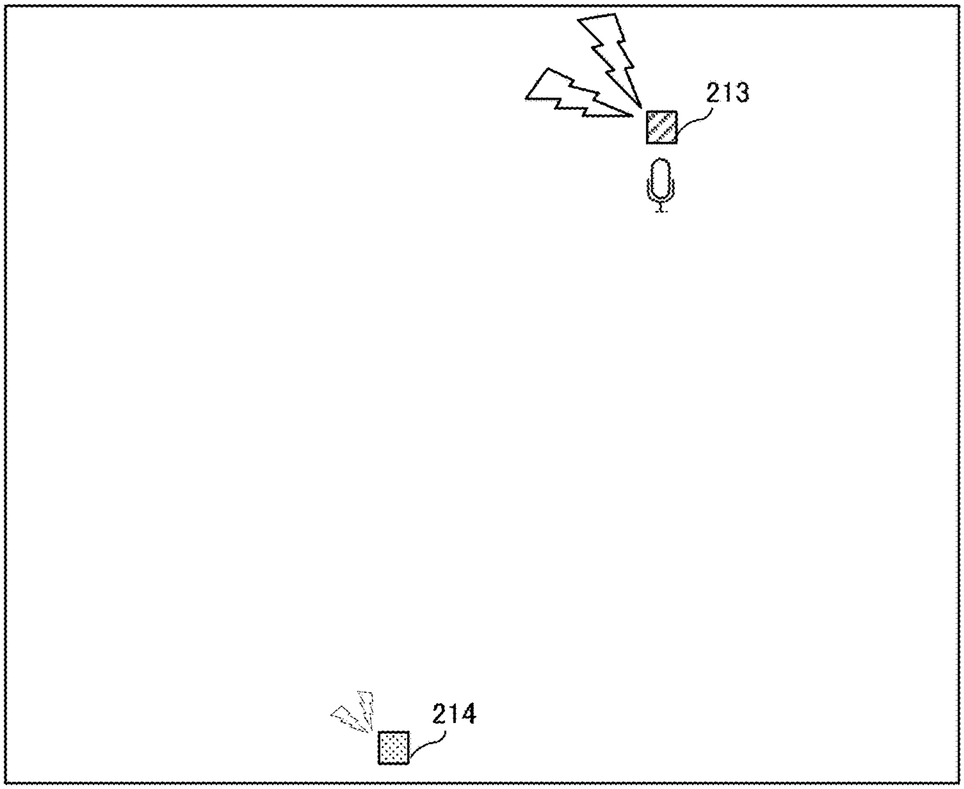
FIG. 16 is a non-limiting example diagram for describing the principle of processing of the exemplary embodiment.

The above is the description of the sound source from which the sound has been reproduced before the instantaneous change in microphone position occurs. Next, a sound source whose reproduction is started after an instantaneous change in microphone position occurs, is considered. FIG. 15 illustrates an example of a game space in a state before an instantaneous change in microphone position occurs, and FIG. 16 illustrates an example of a game space in a state immediately after the instantaneous change in microphone position occurs. In both FIG. 15 and FIG. 16, a third sound source 213 and a fourth sound source 214 are shown. The virtual microphone and the virtual camera which is not shown but located at the same position as the virtual microphone are located near the fourth sound source 214 in FIG. 15, and are moved to a position near the third sound source 213 in FIG. 16. In addition, each sound source starts sound reproduction at the same timing and at the same volume immediately after the instantaneous change in microphone position occurs. In such a case, as for the manner in which the sound is heard at the position of the virtual microphone in FIG. 16, a state where the sound from the third sound source 213 is heard loud (sound heard from a near position) and the sound from the fourth sound source 214 is heard quiet (sound heard from a far position) is expected. In particular, considering that this state is a state where movement of the virtual camera has been completed, the third sound source 213 in the game screen taken by the virtual camera is seen in front of the user. Since the third sound source 213 begins to sound in front of the user, as for the volume of the sound of the third sound source 213, the output level may be set to "1.0" from the beginning, without fading in the output level as described above. In addition, as for the fourth sound source 214 (sound reproduced at a distance), if control of fading out the output level is performed for the volume of the sound of the fourth sound source 21 since the position of the virtual microphone before the instantaneous change in microphone position is nearby, the sound may sound unnatural. It is conceivable to consider such a manner in which the sound is expected to be heard from the sound source whose reproduction is started after an instantaneous change in microphone position occurs. Therefore, in the exemplary embodiment, in addition to the above-described process, the process using the "generation" is also performed as described below.

Next, an outline of the process using the "generation" in the exemplary embodiment will be described. In this process, the generation is divided, based on the timing of the occurrence of an instantaneous change in microphone position (instantaneous change in camera position), into the sound source (hereinafter, referred to as past sound source) from which a sound has been reproduced before the instantaneous change in microphone position and the sound source (hereinafter, referred to as current sound source) whose reproduction is started after the occurrence of the instantaneous change in microphone position. Then, after setting the above output level for each generation, the above-described microphone switching process is performed. Specifically, for the past sound source, the above-described microphone switching process is performed. That is, using both the residual microphone and the current microphone, the output level of each virtual microphone is crossfaded. Meanwhile, for the current sound source, sound processing is performed using only the current microphone. In other words, control, in which the above-described microphone switching process in which the output levels are crossfaded is performed for only the past sound source and the microphone switching process is substantially not performed for the current sound source, is performed. More specifically, until the microphone switching is completed, for the residual microphone, the output level is fixed at "0.0" for the current sound source, and the output level is changed (faded out) over time for the past sound source. That is, the residual microphone does not output any sound of the current sound source to the speaker 6 (even if a sound is acquired). Meanwhile, for the current microphone, the output level is fixed at "1.0" for the current sound source, and the output level is changed (faded in) over time for the past sound source. That is, the current microphone does not change the volume of the sound of the current sound source, and outputs the sound of the current sound source to the speaker 6 with the volume of the acquired sound remaining unchanged. In the exemplary embodiment, in order to achieve such control, the concept of "generation" is used. For example, a generation before the occurrence of an instantaneous change in microphone position is defined as a "first generation", a generation after the occurrence of an instantaneous change in microphone position is defined as a "second generation", and each sound source is caused to belong to one of the generations according to the timing of the start of reproduction of the sound source. Then, the above-described microphone switching process is performed using output levels that are set for each generation.

Figure 17:
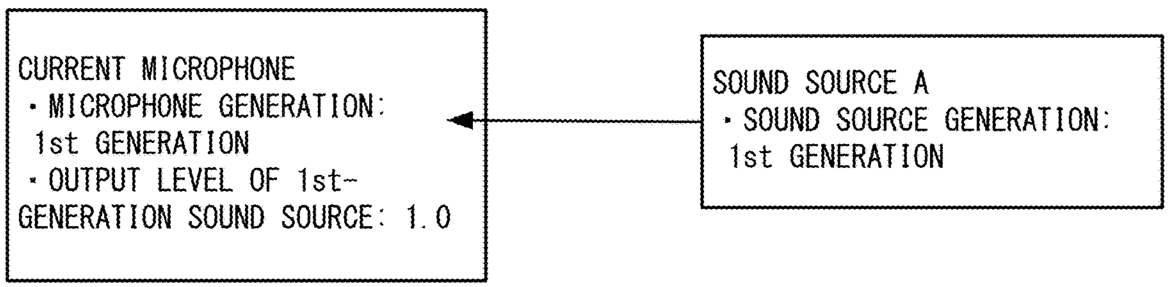
FIG. 17 is a non-limiting example diagram for describing the principle of processing of the exemplary embodiment.

An example of setting the above-described "generation" and "output level" will be described with reference to FIG. 17 to FIG. 20. First, FIG. 17 is a schematic diagram showing a relationship between the virtual microphone and the sound source before an instantaneous change in microphone position occurs. In this state, there is only one current microphone as the virtual microphone. In addition, there is only one sound source A as the sound source (from which a sound is being reproduced). As for the generation, at this time, the "first generation" is set for both the current microphone and the sound source A. In addition, the current microphone is associated with the output level as described above, and this output level is set for each sound source generation. In the example in FIG. 17, "1.0" is set as an output level for a "first-generation sound source". Therefore, the sound from the sound source A (first-generation sound source) acquired by the current microphone is outputted to the speaker 6 at an output level of "1.0".

Figure 18:
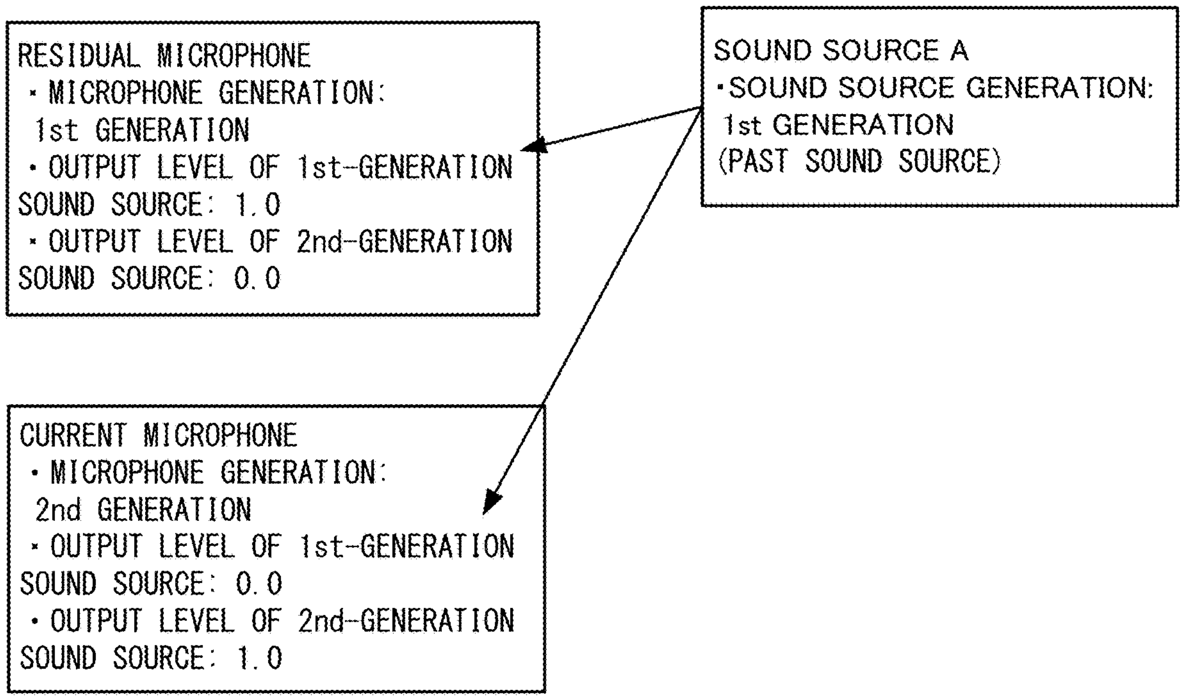
FIG. 18 is a non-limiting example diagram for describing the principle of processing of the exemplary embodiment.

Next, FIG. 18 shows a state before microphone switching is completed after the instantaneous change in microphone position occurs. Therefore, two virtual microphones, that is, a residual microphone and a current microphone, temporarily exist. In addition, the reproduction from the sound source A continues. In FIG. 18, as for the current microphone, the position thereof changes so as to follow the movement of the virtual camera. Then, as for the generation, the generation of the sound source A is still the first generation, and the sound source A corresponds to the above "past sound source" according to the relationship before and after the instantaneous change in microphone position occurs. In addition, for the current microphone, the "second generation" is set as a generation. As for the residual microphone, the "first generation" is set as a generation. Moreover, as an output level that is set for each virtual microphone, an output level for a first-generation sound source and an output level for a second-generation sound source are set (since a second-generation virtual microphone exists). Among them, the output level for a first-generation sound source is changed so as to crossfade over time. Meanwhile, the output level for a second-generation sound source is set to "0.0" as a fixed value for the residual microphone. That is, for the residual microphone, control in which, even if a second-generation sound source appears in the future, a sound reproduced by this second-generation sound source is not outputted to the speaker 6, is performed. In other words, for the residual microphone, control in which the sound of a second-generation sound source is substantially not acquired is performed. In contrast, for the current microphone (which has become a second-generation microphone), the output level for a second-generation sound source is set to "1.0" as a fixed value. Therefore, for the current microphone, control in which the sound reproduced by a second-generation sound source is outputted to the speaker 6 with the volume of the acquired sound remaining unchanged, without particularly changing the volume of the sound, is performed.

Figure 19:
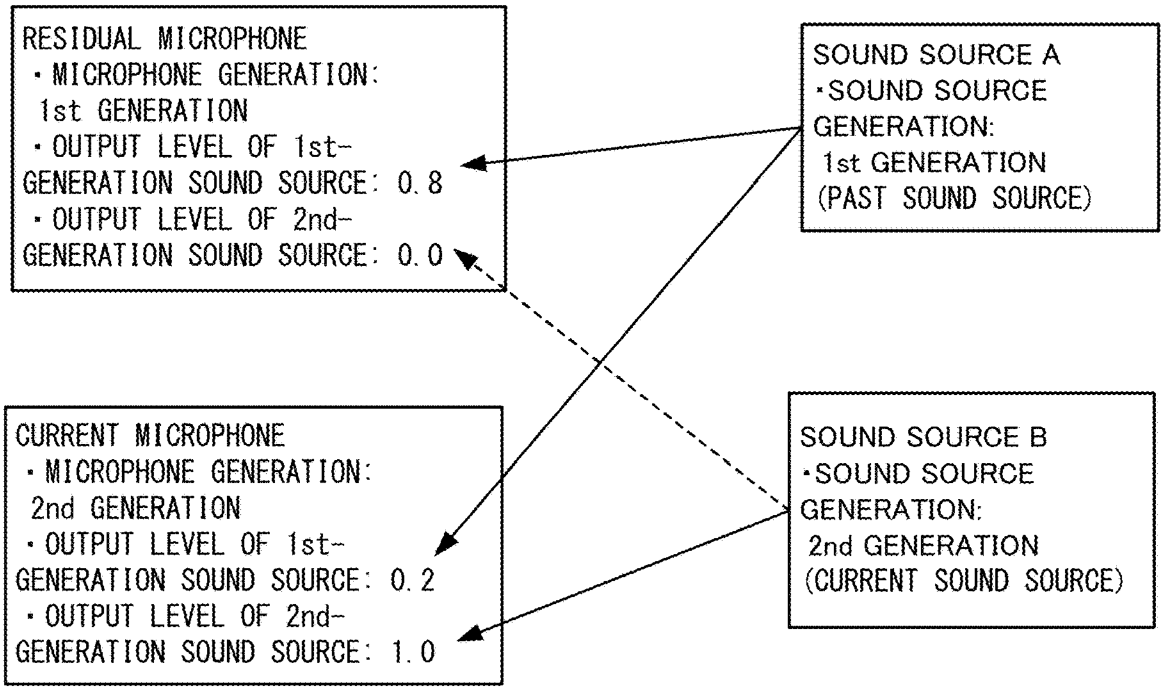
FIG. 19 is a non-limiting example diagram for describing the principle of processing of the exemplary embodiment.

Next, FIG. 19 shows a state where a sound source B which newly starts reproduction is added from the state in FIG. 18. Since the sound source B starts reproduction after the instantaneous change in microphone position occurs, the "second generation" (which is the same as the current microphone at that time) is set for the sound source B. That is, the sound source B corresponds to the above "current sound source" according to the relationship before and after the instantaneous change in microphone position occurs. Then, in the state in FIG. 19, as for the sound of the sound source A, the output level of each virtual microphone for a first-generation sound source is being changed so as to crossfade, and the sound of the sound source A is outputted to the speaker 6 by each virtual microphone on the basis of this output level. Meanwhile, as for the sound of the sound source B, the output level of the residual microphone for a second-generation sound source is "0.0", so that the sound of the sound source B is not outputted from the residual microphone to the speaker 6. That is, the residual microphone substantially does not pick up the sound of the sound source B. In contrast, the output level of the current microphone for a second-generation sound source is "1.0", so that the current microphone outputs the sound from the sound source B to the speaker 6 with the volume of the sound remaining unchanged.

Figure 20:
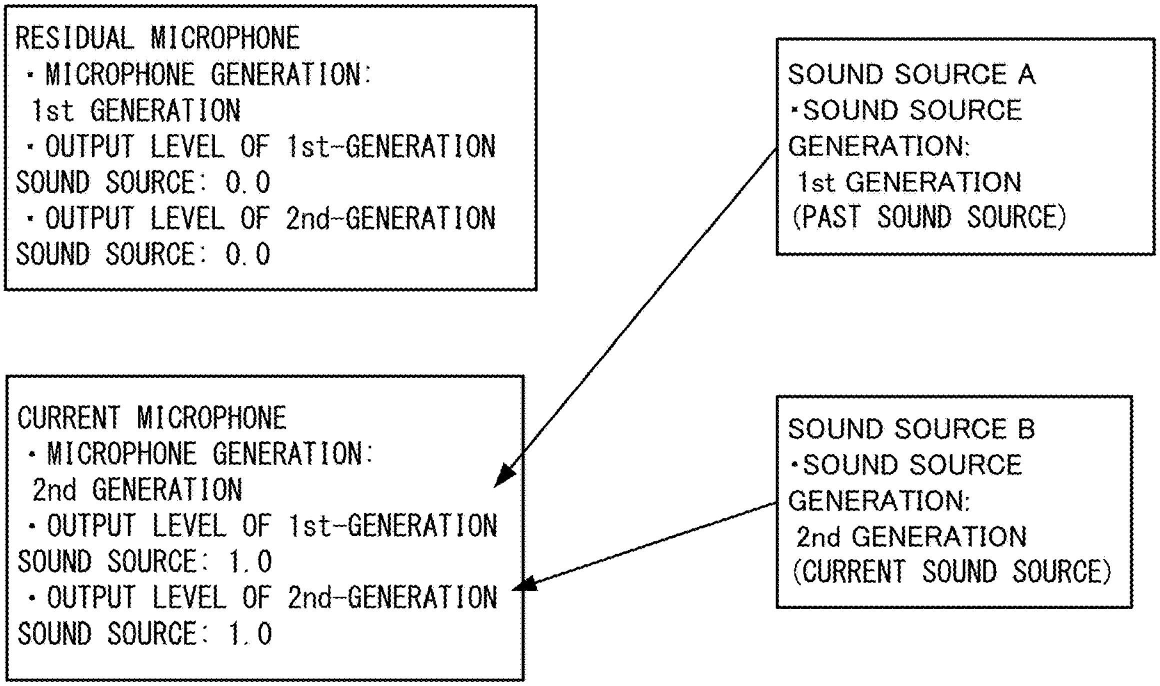
FIG. 20 is a non-limiting example diagram for describing the principle of processing of the exemplary embodiment.

FIG. 20 shows a state when the time has further passed from the state in FIG. 19 and the microphone switching has ended. Specifically, the output level for a first-generation sound source is "0.0" at the residual microphone, and is "1.0" at the current microphone. Both of the sound sources A and B continue reproduction. In this state, no sound is outputted from the residual microphone to the speaker 6, and the sounds of the sound source A and the sound source B are processed only with the current microphone.

As described above, the generation is divided based on the timing of the occurrence of an instantaneous change in microphone position, the output level for the past sound source is crossfaded, and the output level for the current sound source is fixed without performing such crossfade. Accordingly, even if there is a sound source whose reproduction is started immediately after an instantaneous change in microphone position, it is possible to achieve a hearing manner that does not give an uncomfortable feeling.

[Details of Game Processing of Exemplary Embodiment]

Next, the game processing in the exemplary embodiment will be described in more detail with reference to FIG. 21 to FIG. 29.

[Data to be Used]

Figures 21, 22:
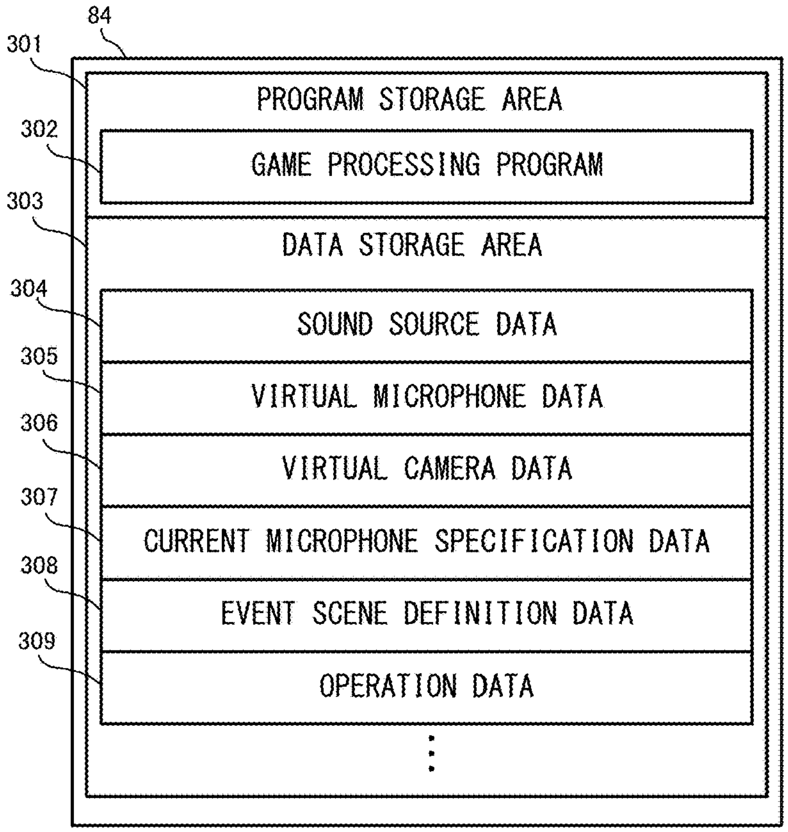
FIG. 21 illustrates a memory map showing a non-limiting example of various kinds of data stored in a storage section 84.
FIG. 22 illustrates a non-limiting example of the data structure of sound source data 304.

First, various kinds of data to be used in the game processing will be described. FIG. 21 illustrates a memory map showing an example of various kinds of data stored in the storage section 84 of the game apparatus 2. The storage section 84 includes a program storage area 301 and a data storage area 303. In the program storage area 301, a game processing program 302 is stored. In addition, in the data storage area 303, sound source data 304, virtual microphone data 305, virtual camera data 306, current microphone specification data 307, event scene definition data 308, operation data 309, etc., are stored.

The game processing program 302 is a program for executing the game processing according to the exemplary embodiment, and also includes a program code for executing the above-described control for the virtual microphone.

The sound source data 304 is data regarding the sound sources 202. FIG. 22 illustrates an example of the data structure of the sound source data 304. The sound source data 304 is a database that includes at least a sound source ID 341, reproduction sound data 342, sound source position-orientation data 343, a sound source generation ID 344, and a reproduction flag 345. The sound source ID 341 is an ID for uniquely identifying each sound source. The reproduction sound data 342 is sound data based on which a sound is reproduced. The sound source position-orientation data 343 is data indicating the position and the orientation of the sound source 202 in the virtual game space. The sound source generation ID 344 is data indicating the above "generation" to which the sound source belongs, and a predetermined generation number is stored. In addition, the content of the sound source generation ID 344 is updated at the timing when sound reproduction is started by the sound source. The reproduction flag 345 is data indicating whether the sound source is reproducing the sound of the reproduction sound data 342.

Referring back to FIG. 21, the virtual microphone data 305 is data regarding the virtual microphones. FIG. 23 illustrates an example of the data structure of the virtual microphone data 305. The virtual microphone data 305 is a database that has items such as a microphone generation ID 351, a residual flag 352, a switching flag 353, a switching completion flag 354, microphone position-orientation data 355, and an output level specification table 356.

The microphone generation ID 351 is an ID indicating the generation of the virtual microphone. In the exemplary embodiment, the number of residual microphones generated temporarily as described above along with the occurrence of an instantaneous change in microphone position is only one. Therefore, the virtual microphone and the microphone generation ID 351 are associated with each other in a one-to-one relationship. That is, in the exemplary embodiment, the microphone generation ID 351 also serves to uniquely identify a plurality of virtual microphones.

The residual flag 352 is a flag for indicating whether the virtual microphone corresponds to a residual microphone. If the residual flag 352 is ON, it indicates that the virtual microphone is a residual microphone, and if the residual flag 352 is OFF, it indicates that the virtual microphone is a current microphone.

The switching flag 353 is a flag for indicating whether the virtual microphone is in a state during the microphone switching. If the switching flag 353 is ON, it indicates that the virtual microphone is in a state during the microphone switching, and if the switching flag 353 is OFF, it indicates that the virtual microphone is not in a state during the microphone switching.

The switching completion flag 354 is a flag for indicating the virtual microphone that is in a state immediately after the microphone switching is completed. The switching completion flag 354 is set to be ON when the microphone switching for the virtual microphone is completed. The switching completion flag 354 is used for determining the necessity of processing at the time of switching completion described later.

The microphone position-orientation data 355 is data for indicating the current position of the virtual microphone (each of the current microphone and the residual microphone) in the virtual game space. In addition, the microphone position-orientation data 355 also includes information indicating the orientation of the virtual microphone.

The output level specification table 356 is data for specifying the output level of the virtual microphone for each sound source generation. Specifically, the output level specification table 356 is data in a table format including items such as a sound source generation 357 and output level data 358. The sound source generation 357 is data for specifying the generation of each sound source, and the output level data 358 is data that specifies an output level for the sound source of the generation. In addition, the output level data 358 is also data whose content can be changed over time as described above, depending on the generation of the sound source. In consideration of the case where an instantaneous change in microphone position (camera position) occurs in multiple stages, the output level specification table 356 may be treated as data in a ring buffer format. For example, the number of buffers may be set to 4, and data from the newest generation to the generation previous to the newest generation by four generations may be stored. Then, when an instantaneous change in microphone position occurs, the data may be updated in the order from the oldest.

Referring back to FIG. 21, the virtual camera data 306 is data that specifies the current position, orientation, angle of view, etc., of the virtual camera.

The current microphone specification data 307 is data that specifies which virtual microphone is the current microphone at the current time. In a state where the microphone switching process is not being performed, only one virtual microphone exists, and necessarily becomes a current microphone.

The event scene definition data 308 is data that defines the contents of the event demonstration scene described above. The event scene definition data 308 can include data that defines the contents of each of a plurality of event demonstration scenes. The data regarding each event includes the above event start condition, information that defines the movement contents of the player character 201 and NPCs in the event demonstration scene, information that defines the camera movement of the virtual camera in the event demonstration scene, etc.

The operation data 309 is data indicating the content of an operation performed on the controller 4. In the exemplary embodiment, the operation data 309 includes data indicating pressed states of the buttons such as the cross key or an input state to the analog stick provided to the controller 4. The content of the operation data 309 is updated in predetermined cycles on the basis of a signal from the controller 4.

In addition, various kinds of data to be used in the game processing are stored as necessary in the storage section 84. For example, history data of the positions of the virtual camera and the virtual microphone from the last frame to the frame previous to the current frame by several frames, etc., which are used for determining the occurrence of the above instantaneous change in camera position or microphone position, can also be stored.

[Details of Processing Executed by Processor 81]

Next, the game processing according to the exemplary embodiment will be described in detail. Here, processing related to the above-described control of the virtual microphone will be mainly described, and other game processing will be briefly described and the detailed description thereof is omitted.

Figure 24:
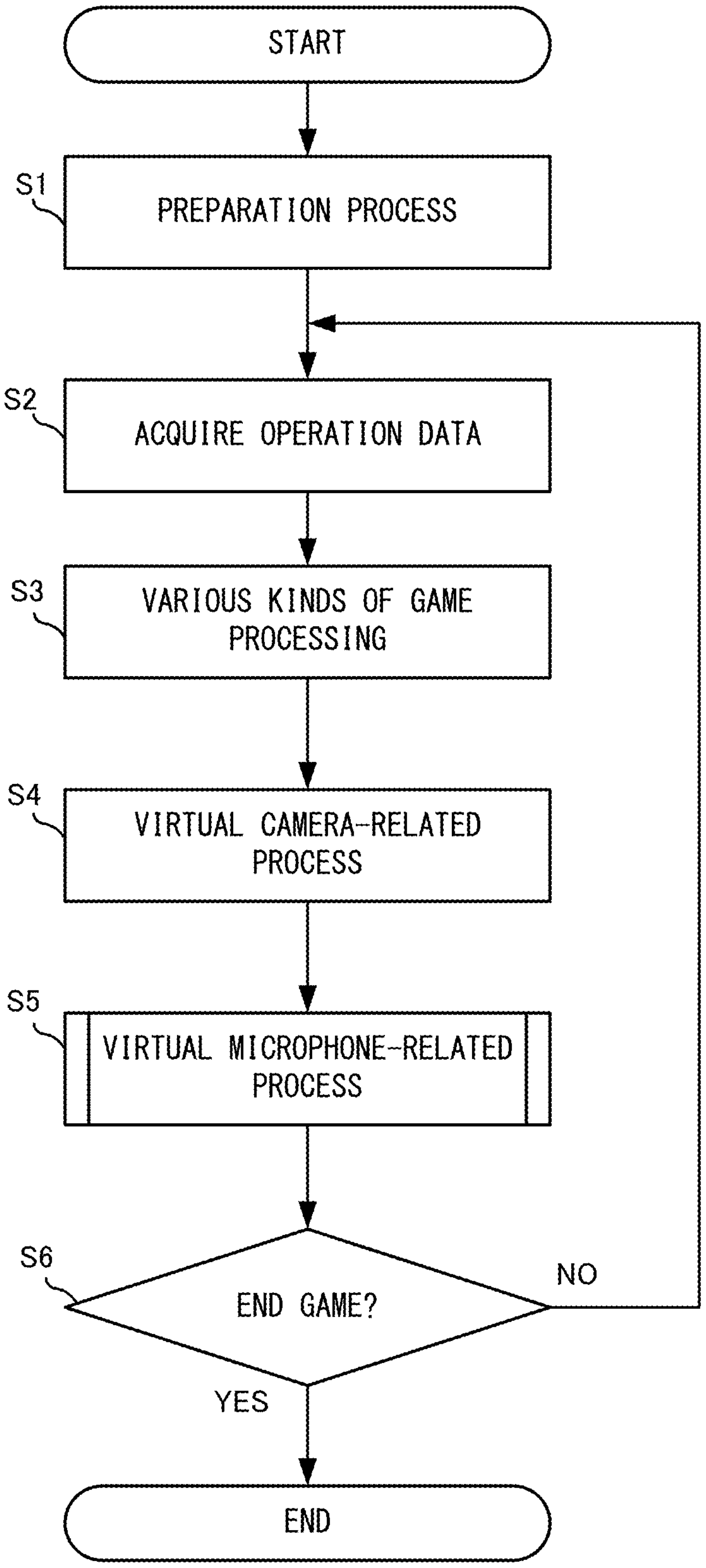
FIG. 24 is a non-limiting example flowchart showing the details of game processing according to the exemplary embodiment.

FIG. 24 is a flowchart showing the details of the game processing according to the exemplary embodiment. A process loop of steps S2 to S6 shown in FIG. 24 is repeatedly executed every frame period. In addition, this flowchart is merely an example of the processing. Therefore, the order of each process step may be changed as long as the same result is obtained. In addition, the values of variables and thresholds used in determination steps are also merely examples, and other values may be used as necessary. When the game processing according to the exemplary embodiment is started, first, in step S1, the processor 81 executes a preparation process. Specifically, the processor 81 constructs a virtual game space, and places objects such as the player character 201, various NPCs, and various sound sources 202 in the virtual game space as appropriate. Furthermore, the processor 81 also places the virtual camera and the virtual microphone at a predetermined position (based on the position of the player character 201). Accordingly, the virtual camera data 306 and the virtual microphone data 305 are also generated. At this time, the number of data sets included in the virtual microphone data 305 is only one. In addition, a value (initial value of "01") of the microphone generation ID 351 is set in the current microphone specification data 307. Furthermore, the processor 81 takes an image of the virtual game space by the virtual camera to generate a game image, and generates a game sound on the basis of the sounds of the various sound sources 202 acquired by the virtual microphone. Then, the processor 81 outputs the game image to the display unit 5, and outputs the game sound to the speaker 6.

Next, in step S2, the processor 81 acquires the operation data 309.

Next, in step S3, the processor 81 executes various kinds of game processing. Here, the following processing is mainly performed. First, the processor 81 determines whether the current state is during an event demonstration scene. If the current state is not during an event demonstration scene, the processor 81 executes a movement control process for the player character 201 on the basis of the operation data 309. Furthermore, accordingly, the processor 81 also executes various kinds of game processing such as contact determination processing. As a result of moving the player character 201, if the player character 201 has come into contact with an object of the warp gimmick described above, a process of further changing the current position of the player character 201 is performed on the basis of the warp gimmick. In addition, the processor 81 also determines whether the event start condition has been satisfied. Examples of the event start condition include a condition that the player character 201 has reached a predetermined position, and a condition that the player character 201 has spoken to a predetermined NPC. If the event start condition has been satisfied, the processor 81 executes a process for transition to an event demonstration scene. On the other hand, if the current state is during an event demonstration scene, the processor 81 automatically controls the movement of various characters on the basis of the contents of the event scene definition data 308. Furthermore, the processor 81 also determines whether the event demonstration scene has ended. If the event demonstration scene has ended, the processor 81 shifts to a game mode in which the movement control process for the player character 201 is executed on the basis of the operation data 309 as described above.

Next, in step S4, the processor 81 executes a virtual camera-related process. In this process, an image of the virtual game space in which the result of the game processing is reflected is taken by the virtual camera and outputted to the display unit 5. Specifically, first, the processor 81 determines whether the current state is during an event demonstration scene. Then, if the current state is during an event demonstration scene, the processor 81 performs movement control for the virtual camera on the basis of the contents of the event scene definition data 308. As a result, the above-described instantaneous change in camera position may occur during the event demonstration scene. The case immediately after the start of the event demonstration scene corresponds to a state "during an event demonstration scene", and the virtual camera is moved to the position defined as the position at the start of the event demonstration scene. As a result, the above-described instantaneous change in camera position may occur as the event demonstration scene starts. On the other hand, if the current state is not during an event demonstration scene, the processor 81 performs movement control such that the virtual camera follows the player character 201, on the basis of the position of the player character 201. In addition, along with the above-described movement control for the virtual camera, the contents (current position, etc.) of the virtual camera data 306 are also updated as appropriate. Then, the processor 81 takes an image of the virtual game space by the virtual camera to generate a game image, and outputs the game image to the display unit 5.

Next, in step S5, the processor 81 executes a virtual microphone-related process. In this process, while the above-described microphone switching process is performed as appropriate, the sound of each sound source 202 acquired by the virtual microphone is outputted to the speaker 6.

[Sound Source Reproduction Process]

Figure 25:
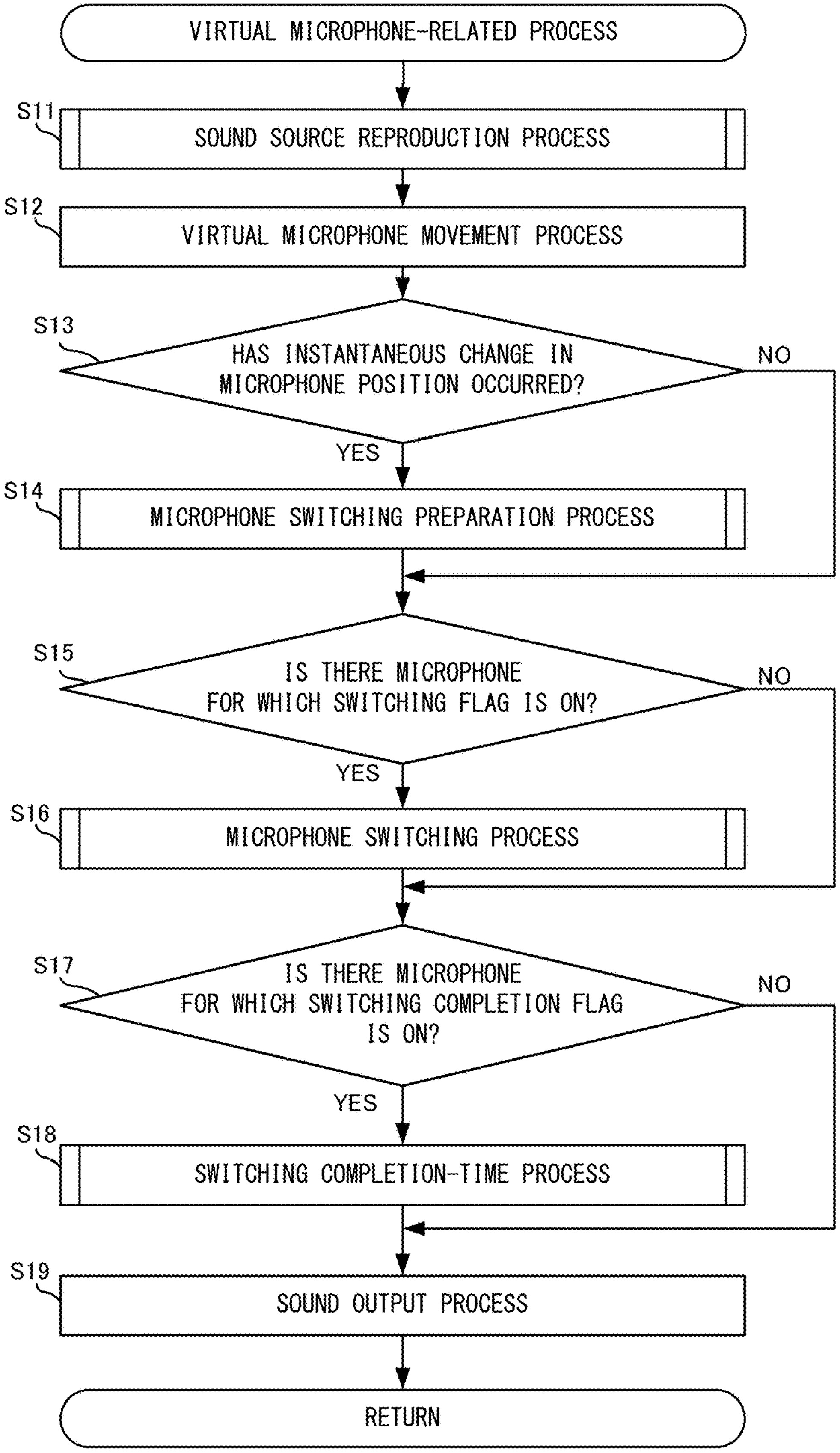
FIG. 25 is a non-limiting example flowchart showing the details of a virtual microphone-related process.
Figure 26:
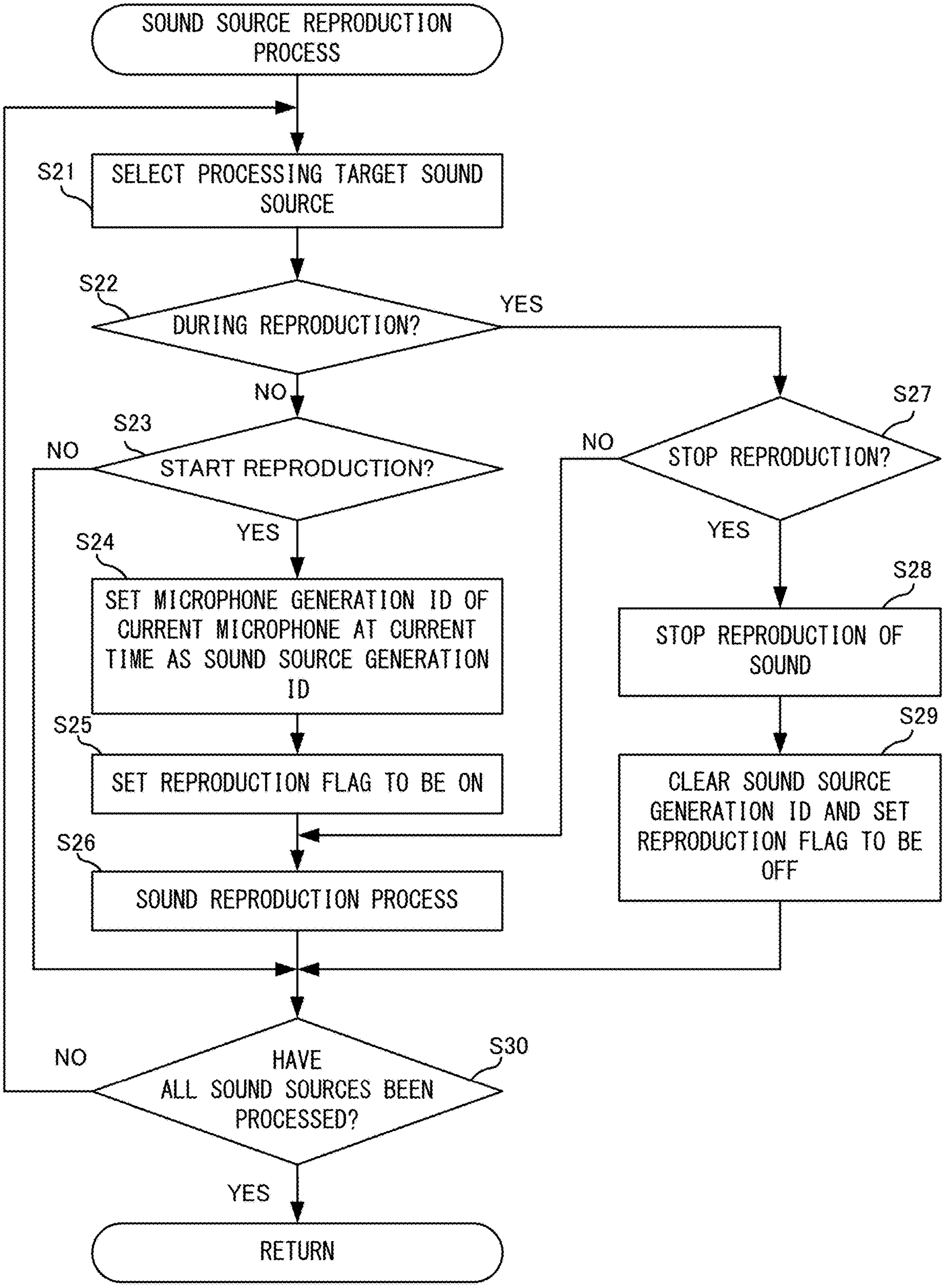
FIG. 26 is a non-limiting example flowchart showing the details of a sound source reproduction process.

FIG. 25 is a flowchart showing the details of the virtual microphone-related process. In FIG. 24, first, in step S11, the processor 81 executes a sound source reproduction process. This process is a process for reproducing a predetermined sound from each sound source that exists in the virtual game space. FIG. 26 is a flowchart showing the details of the sound source reproduction process. In FIG. 26, first, in step S21, the processor 81 selects one sound source 202 as a target of the processing described below, from among the sound sources 202 in the virtual game space. Hereinafter, the selected sound source 202 is referred to as a processing target sound source. The method for this selection may be any method. For example, the sound sources 202 that exist in a predetermined range centered on the virtual microphone may be extracted, and selected in the order from the one having the smallest sound source ID 341.

Next, in step S22, the processor 81 determines whether the current state is a state where the processing target sound source is reproducing a predetermined sound, on the basis of the reproduction flag 345. If the current state is not a state of reproducing a predetermined sound (NO in step S22), in step S23, the processor 81 determines whether a predetermined condition for starting sound reproduction (hereinafter, referred to as a reproduction start condition) has been satisfied for the processing target sound source. As a result of the determination, if the reproduction start condition has been satisfied (YES in step S23), in step S24, the processor 81 sets the same value (generation number) as the microphone generation ID 351 of the current microphone at this time, as the sound source generation ID 344 of the processing target sound source.

Next, in step S25, the processor 81 sets the reproduction flag 345 to be ON for the processing target sound source.

Next, in step S26, the processor 81 starts reproduction of the predetermined sound corresponding to the processing target sound source, on the basis of the reproduction sound data 342 of the processing target sound source. Then, the processor 81 advances the processing to step S30 described later.

On the other hand, as a result of the determination in step S23, if the reproduction start condition has not been satisfied (NO in step S23), the processor 81 advances the processing to step S30 described later.

Next, the processing performed if, as a result of the determination in step S22, it is determined that the current state is a state where the processing target sound source is reproducing a predetermined sound (YES in step S22), will be described. In this case, in step S27, the processor 81 determines whether a predetermined condition for stopping reproduction (hereinafter, referred to as a reproduction stop condition) has been satisfied for the processing target sound source. As a result of the determination, if the reproduction stop condition has not been satisfied (NO in step S27), the processor 81 advances the processing to step S26, and continues the process of reproducing the predetermined sound.

On the other hand, if the reproduction stop condition has been satisfied (YES in step S27), in step S28, the processor 81 stops the sound reproduction process for the processing target sound source. In subsequent step S29, the processor 81 clears the sound source generation ID 344 of the processing target sound source (sets a Null value), and sets the reproduction flag 345 to be OFF.

Next, in step S30, the processor 81 determines whether the above processes have been performed for all the sound sources 202. If any unprocessed sound source 202 remains (NO in step S30), the processor 81 returns to step S21, selects the next processing target sound source, and repeats the processes. On the other hand, if the above processes have been performed for all the sound sources 202 (YES in step S30), the processor 81 ends the sound source reproduction process.

[Processing when Instantaneous Change in Microphone Position Occurs]

Referring back to FIG. 25, next, in step S12, the processor 81 performs a virtual microphone (current microphone) movement process. In the virtual camera-related process, the contents of the virtual camera data 306 can be updated as appropriate (so as to follow the position of the player character 201). The processor 81 performs a process of referring to the virtual camera data 306 and moving the current microphone by setting the content of the microphone position-orientation data 355 of the current microphone to the same position as the current virtual camera.

Next, in step S13, the processor 81 determines whether an instantaneous change in microphone position has occurred. In the exemplary embodiment, if the above instantaneous change in camera position has occurred, it substantially means that an instantaneous change in microphone position has occurred. Therefore, for example, whether an instantaneous change in microphone position has occurred can be determined on the basis of whether or not the difference in distance between the position at the last frame and the current position of the virtual camera or the virtual microphone is equal to or greater than a predetermined value. As a result of the determination, if an instantaneous change in microphone position has not occurred (NO in step S13), the processor 81 advances the processing to step S15 described later. If an instantaneous change in microphone position has occurred (YES in step S13), in step S14, the processor 81 executes a microphone switching preparation process. In this process, mainly, the above-described generation of a residual microphone and setting of the output level specification table 356 are performed.

Figure 27:
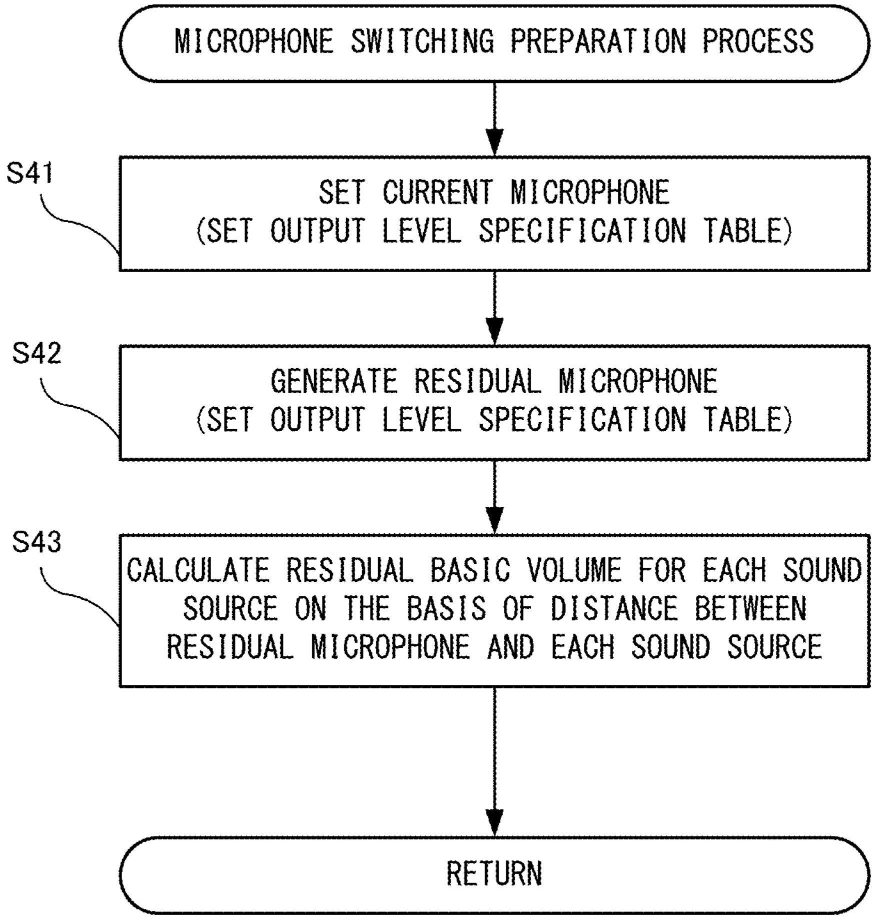
FIG. 27 is a non-limiting example flowchart showing the details of a microphone switching preparation process.

FIG. 27 is a flowchart showing the details of the microphone switching preparation process. In FIG. 27, first, in step S41, the processor 81 performs a setting process for the current microphone. Specifically, the processor 81 sets a generation higher by one, as the microphone generation ID 351 of the virtual microphone. For example, if the microphone generation ID 351 has been "01", the processor 81 sets "02" as the microphone generation ID 351. Next, the processor 81 sets the newly set microphone generation ID 351 in the current microphone specification data 307. Next, the processor 81 sets the contents of the output level specification table 356 (for the current microphone). Since the virtual microphone is a current microphone, the processor 81 sets "1.0" as a fixed value in the output level data 358 for the generation sound source 202 having the same value as (or a value higher than) the microphone generation ID 351 of the current microphone. In this case, data of the generation corresponding to the newly set microphone generation ID 351 is added to the output level specification table 356. In addition, if the output level specification table 356 is already filled with data for four generations, the data is replaced in the order from the oldest. On the other hand, the processor 81 sets "0.0" as the output level data 358 for the generation sound source 202 having a value less than the microphone generation ID 351 of the current microphone itself. The value of the output level data 358 set here changes toward "1.0" over time. Moreover, the processor 81 sets the switching flag 353 to be ON for the current microphone, and sets the switching completion flag 354 to be OFF for the current microphone.

Next, in step S42, the processor 81 executes a process of generating a residual microphone at the position of the current microphone before movement. Specifically, the processor 81 generates data having the following contents, and adds the generated data to the virtual microphone data 305. First, as the microphone generation ID 351, the microphone generation ID 351 of the current microphone before movement is set (a generation previous by one to the generation of the current microphone at the current time). In addition, the residual flag 352 and the switching flag 353 are set to be ON, and the switching completion flag 354 is set to be OFF. The position of the current microphone before movement is set in the microphone position-orientation data 355. In the output level specification table 356, "0.0" is uniformly set as a fixed value for sound source generations newer than the generation of the residual microphone itself. "1.0" is set as an initial value for sound source generations each of which is the same as or older than the generation of the residual microphone itself. This value is a value that changes over time.

Next, in step S43, the processor 81 calculates the volume of the sound from each sound source 202 acquired by the residual microphone at this time, on the basis of the positional relationship (distance, etc.) between the residual microphone and the sound source 202 (the sound source 202 that is reproducing a sound) of the same generation as the residual microphone. Hereinafter, this volume is referred to as a residual basic volume. In addition, the residual basic volume is treated as the volume when the output level of the residual microphone is "1.0". Here, in the processing described later, a process of gradually decreasing the volume from the residual basic volume over time is performed. Here, if the sound source 202 is, for example, an autonomously movable object or the like, the position of the sound source 202 may change with respect to the residual microphone until the microphone switching is completed. In this regard, in the exemplary embodiment, such a change in positional relationship is not taken into consideration, and a volume corresponding to the above output level is calculated based on the above residual basic volume. That is, until the microphone switching is completed, a process of gradually decreasing the volume with the residual basic volume calculated here being used as a base, is performed regardless of whether or not the position of the sound source 202 changes with respect to the residual microphone. This is due to the viewpoint of reducing the processing load. That is, if, also during the microphone switching the process is performed such that a change in the position of the sound source with respect to the residual microphone is reflected, the processing load may be increased, so that such a residual basic volume is used as a reference. In addition, this is considered to be because, since the microphone switching is completed in a short time of 0.3 seconds as described above, even if the process is performed using such a residual basic volume, the user is not made to feel uncomfortable.

When the process in step S43 ends, the processor 81 ends the microphone switching preparation process.

[Processing During Microphone Switching]

Referring back to FIG. 25, next, in step S15, the processor 81 refers to the switching flag 353 in the virtual microphone data 305, and determines whether there is a virtual microphone for which the microphone switching process is being performed. As a result of the determination, if there is no virtual microphone for which the microphone switching process is being performed (NO in step S15), the processor 81 advances the processing to step S17 described later. On the other hand, if there is a virtual microphone for which the microphone switching process is being performed (YES in step S15), in step S16, the processor 81 executes the microphone switching process.

Figure 28:
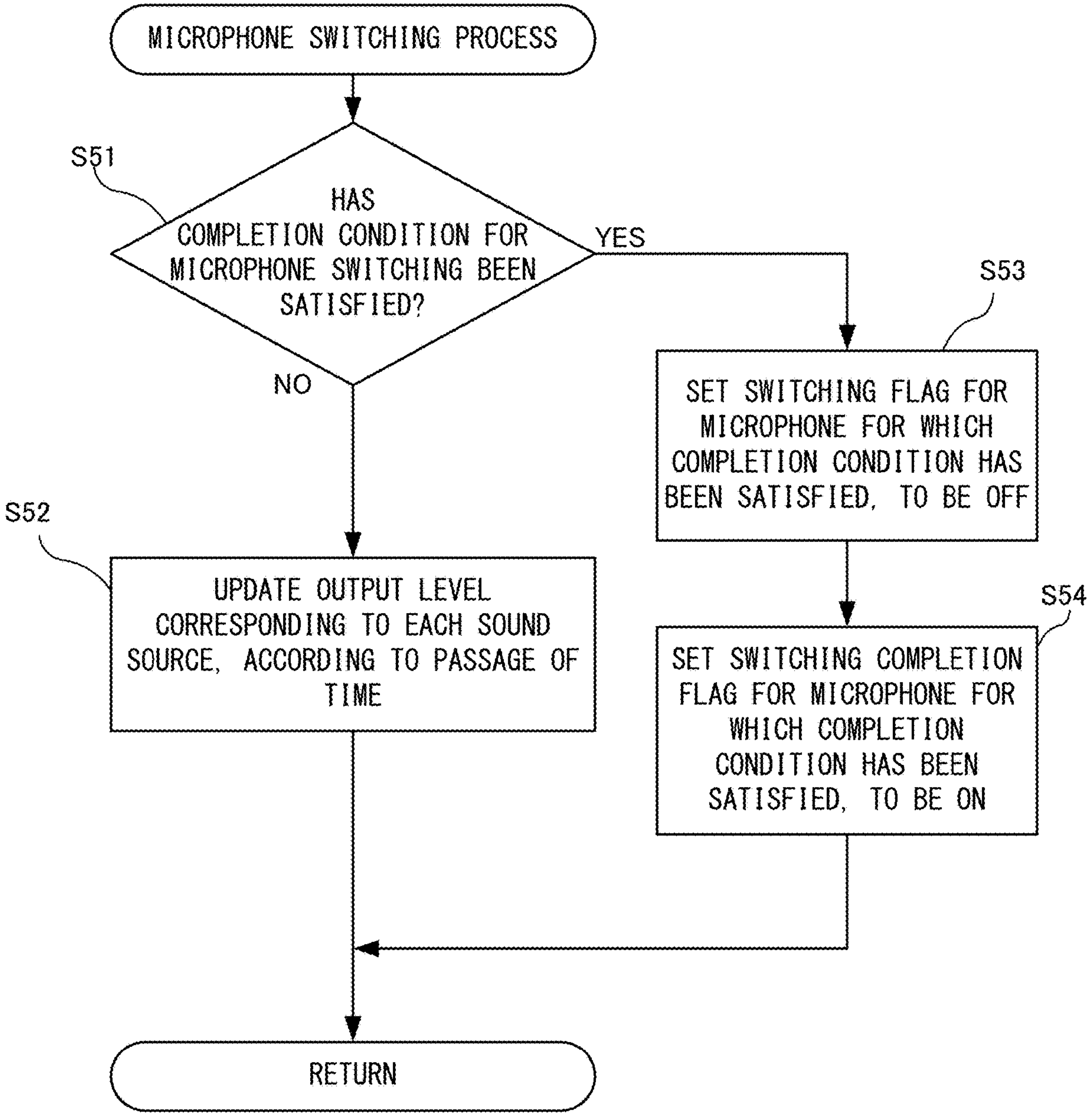
FIG. 28 is a non-limiting example flowchart showing the details of a microphone switching process.

FIG. 28 is a flowchart showing the details of the microphone switching process. First, in step S51, the processor 81 determines whether a condition for completing the microphone switching has been satisfied. Specifically, the processor 81 determines whether the output level data 358 of the residual microphone is all "0.0" for the sound source of each generation, and the output level data 358 of the current microphone is all "1.0" for the sound source of each generation. That is, the processor 81 determines whether the current state is a state where the sound outputted to the speaker 6 is only from the current microphone. As a result of the determination, if the condition for completing the microphone switching has not being satisfied yet (NO in step S51), next, in step S52, the processor 81 updates the contents of the output level data 358 such that the output levels of the current microphone and the residual microphone crossfade according to the time elapsed from the occurrence of the instantaneous change in microphone position. That is, for the current microphone, the processor 81 updates the output level data 358 for the sound source generation 357 less than the microphone generation ID 351 (that is, of the past sound source) so as to gradually fade in from "0.0" toward "1.0" (over 0.3 seconds in this example). In addition, the output level data 358 for the other sound source generation 357 (of the current sound source) is kept fixed at "1.0". Moreover, for the residual microphone, the processor 81 updates the output level data 358 for the same sound source generation 357 (past sound source) as the microphone generation ID 351 so as to gradually fade out from "1.0" toward "0.0" (over 0.3 seconds). In addition, the output level data 358 for the sound source generation 357 (the current sound source) newer than the generation of the residual microphone itself, is kept fixed at "0.0". Then, the processor 81 ends the microphone switching process.

On the other hand, as a result of the determination in step S51, if the condition for completing the microphone switching has been satisfied (YES in step S51), in step S53, the processor 81 sets the switching flag 353 to be OFF for the residual microphone and the current microphone for which the completion condition has been satisfied.

Next, in step S54, the processor 81 sets the switching completion flag 354 to be ON for the residual microphone and the current microphone for which the condition for completing the microphone switching has been satisfied. Then, the processor 81 ends the microphone switching process.

[Processing Performed Immediately after Completion of Microphone Switching]

Referring back to FIG. 25, next, in step S17, the processor 81 determines whether there is a virtual microphone for which the switching completion flag 354 is ON. As a result of the determination, if there is no virtual microphone for which the switching completion flag 354 is ON (NO in step S17), the processor 81 advances the processing to step S19 described later. If there is a virtual microphone for which the switching completion flag 354 is ON (YES in step S17), in step S18, the processor 81 executes a switching completion-time process. In the switching completion-time process, a generation merging process and a process of deleting the residual microphone are mainly performed.

Figure 29:
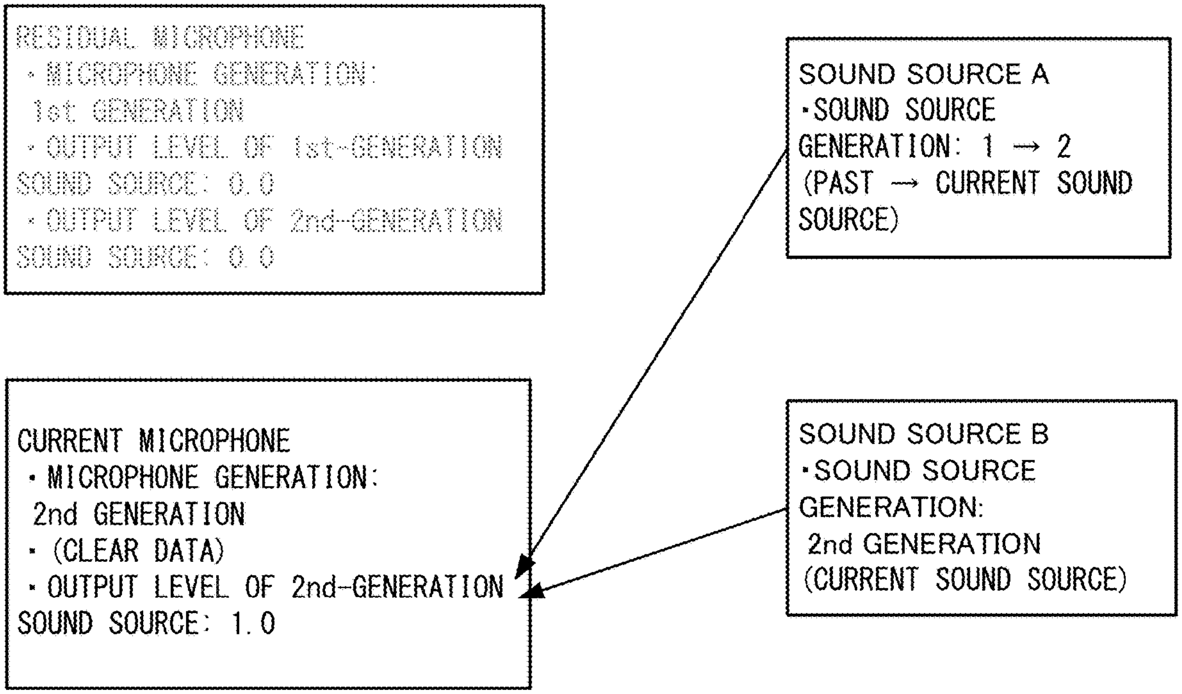
FIG. 29 illustrates a non-limiting example of an outline of a generation merging process.

Here, an outline of the generation merging process performed in the switching completion-time process will be described. In this process, after the microphone switching is completed, the sound source generation ID 344 for the sound source 202 of an old generation is updated with that of a new generation. That is, a process of merging the generation of the sound source 202 with the latest one is performed. FIG. 29 shows the concept of the switching completion-time process. FIG. 29 is also an example of setting of "generation" and "output level" after FIG. 20. In FIG. 29, the sound source generation of the sound source A is updated from "1" to "2". Accordingly, the sound source generations of both the sound sources A and B are made uniform to be second generation. As a result, only the output level of the current microphone for a second-generation sound source is used. Therefore, in the exemplary embodiment, a process of clearing the contents of the sound source generation 357 and the output level data 358 for a "first-generation sound source" (no longer used) of the current microphone (setting Null) is also performed. Furthermore, a process of deleting the data for the residual microphone from the virtual microphone data 305 is also performed.

Figure 30:
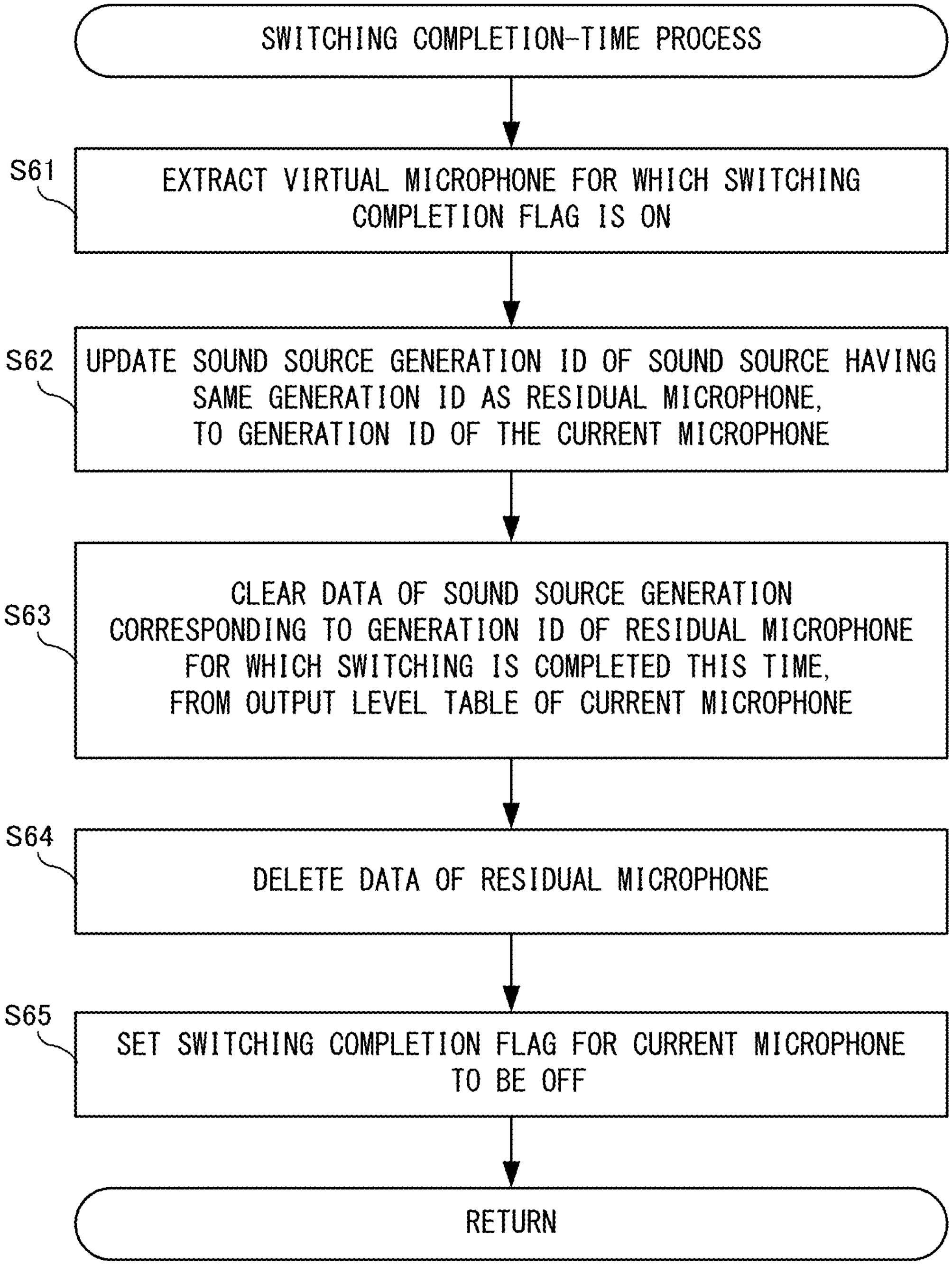
FIG. 30 is a non-limiting example flowchart showing the details of a switching completion-time process.

FIG. 30 is a flowchart showing the details of the switching completion-time process. First, in step S61, the processor 81 refers to the virtual microphone data 305 and extracts the virtual microphone for which the switching completion flag 354 is ON.

Next, in step S62, the processor 81 extracts the sound source 202 of the same generation as the microphone generation ID 351 of the residual microphone, from the sound source data 304. Then, the processor 81 updates the sound source generation ID 344 of the extracted sound source to the same generation as the microphone generation ID 351 of the current microphone.

Next, in step S63, the processor 81 clears the data (the sound source generation 357 and the output level data 358) for the sound source generation corresponding to the microphone generation ID 351 of the residual microphone for which the switching is completed this time, from the output level specification table 356 for the current microphone (sets Null).

Next, in step S64, the processor 81 deletes the data for the residual microphone for which the microphone switching is completed this time, from the virtual microphone data 305.

Next, in step S65, the processor 81 sets the switching completion flag 354 to be OFF for the current microphone. This is the end of the switching completion-time process.

[Process of Outputting Sound to Speaker 6]

Referring back to FIG. 25, next, in step S19, the processor 81 executes a sound output process. Specifically, if there is a residual microphone, that is, if the current state is during microphone switching, the processor 81 calculates the volume of the sound of each sound source that is to be outputted from the residual microphone to the speaker 6, on the basis of the contents of the output level specification table 356 for the residual microphone and the residual basic volume. In addition, for the current microphone, the following process is performed. First, the processor 81 calculates the volume of the sound from each sound source acquired at the position of the current microphone at this time (hereinafter, referred to as current basic volume). Next, the processor 81 calculates the volume of the sound of each sound source that is to be outputted from the current microphone to the speaker 6, on the basis of the contents of the output level specification table 356 for the current microphone and the current basic volume. Then, if the current state is during microphone switching, the processor 81 combines both of the outputs of the residual microphone and the current microphone to generate a sound signal to be outputted to the speaker 6, and outputs the sound signal to the speaker 6. On the other hand, if the current state is not during microphone switching, the processor 81 generates a sound signal to be outputted to the speaker 6, using only the current microphone, and outputs the sound signal to the speaker 6. That is, the processor 81 performs output to the speaker 6 at the same volume as the current basic volume. Then, the processor 81 ends the virtual microphone-related process.

As for the current basic volume, in another exemplary embodiment, the same process as that for the above-described residual basic volume may be performed. That is, until the microphone switching is completed, even if the position of the sound source changes with respect to the current microphone, the process may be performed without taking into consideration this position change.

Referring back to FIG. 24, next, in step S6, the processor 81 determines whether a condition for ending the game processing has been satisfied. For example, the processor 81 determines whether a game end instruction operation has been performed by the user. If this condition has not been satisfied (NO in step S6), the processor 81 returns to step S2 and repeats the processes. On the other hand, if this condition has been satisfied (YES in step S6), the processor 81 ends the game processing.

This is the end of the detailed description of the game processing according to the exemplary embodiment.

As described above, in the exemplary embodiment, if the position of the virtual microphone (virtual camera) is instantaneously and considerably moved, a virtual microphone is provided at each of positions before and after movement, so that a plurality of virtual microphones exist temporarily. Then, the output level from each virtual microphone to the speaker 6 is changed so as to crossfade. Accordingly, an abrupt change in the sound outputted from the speaker 6 can be suppressed, and the user can be prevented from hearing the outputted sound such that noise is included therein.

[Modifications]

In the above embodiment, the case where the number of virtual cameras is one has been described as an example. In another exemplary embodiment, a plurality of virtual cameras and a plurality of virtual microphones may be prepared, and control in which a virtual camera and a virtual microphone (current camera/current microphone) to be used are switched according to whether or not it is an event demonstration scene may be performed. For example, a game camera which is a normally used virtual camera and moves so as to follow the player character 201, and two virtual cameras which are event cameras used exclusively for an event demonstration scene, are placed in a virtual space. In addition, virtual microphones (game microphone, event microphones) are placed at the same positions as the virtual cameras, respectively. Then, control in which only either of these cameras and only either of these microphones are enabled is performed. That is, control may be performed in which the game camera (game microphone) is enabled as the initial state, and when a condition for starting an event demonstration scene is satisfied, the game camera (game microphone) is disabled and the event cameras (event microphones) are enabled. Even when switching the current camera/current microphone among the plurality of virtual cameras/virtual microphones, it is possible to apply the above-described virtual microphone switching process. In such a case, if the change in the position of the current camera/current microphone is greater than a predetermined distance, it means that the above condition for an instantaneous change in camera position/instantaneous change in microphone position is satisfied. In addition, in the case of performing such control, instead of "generating/deleting" the residual microphone, it is sufficient to perform control in which the residual microphone is "enabled/disabled", for example. In other words, it is sufficient to perform control in which the role of the current microphone and the role of the residual microphone are switched between the game microphone and the event microphones.

In the above embodiment, as one example of the condition for starting the microphone switching process, the occurrence of an instantaneous change in microphone position, that is, a change in the position of the virtual microphone before and after one frame being equal to or greater than a predetermined distance, has been described. In addition, the following conditions may be used as the condition for starting the microphone switching process. For example, when the process related to warp is performed as described above, it may be determined that the condition for starting the microphone switching process is satisfied (regardless of the magnitude of the actual movement distance). Moreover, when a condition for the player character 201 to move at a high speed is satisfied, and control in which the player character 201 is moved at a high speed is performed, it may be determined that the condition for starting the microphone switching process is satisfied (regardless of the magnitude of the actual movement distance). Specifically, this is the case where a command for the player character 201 to move at a higher speed than the movement speed at the time of normal movement is inputted. Furthermore, this is the case where, even in the absence of such a command input, a condition for high-speed movement is satisfied (for example, the case where the player character 201 is on a "floor that allows sliding at a high speed in an arrow direction"), and high-speed movement control of the player character 201 is actually performed. Moreover, in the case where a plurality of virtual cameras are prepared as described above, when switching is performed from the game camera (microphone) to the event camera (microphone) as described above, the above-described microphone switching process may be performed uniformly regardless of the magnitude of the distance between both cameras.

As another example of the condition for starting the microphone switching process, when using the warp gimmick described above, for example, the microphone switching process may be started when a position away from the current position by a predetermined distance or more is specified as the warp destination. That is, when the warp destination is specified without calculating the actual movement distance after warp, it may be determined that the condition for starting the microphone switching process is satisfied.

During reproduction of the event demonstration scene, since the movement content and the movement path of the virtual camera are set in advance, a scene in which the virtual camera instantaneously moves by a predetermined distance or more can also be determined in advance. Therefore, in a scene, in the event demonstration scene, which is preset such that the virtual camera instantaneously moves, microphone switching may be set such that the microphone switching is started in synchronization with the transition to this scene without calculating the movement speed or the like of the virtual camera. In addition, in an embodiment where a plurality of virtual cameras are used as described above, when switching from the game camera to the event camera, it is possible to determine in advance an event in which switching occurs such that the position of the camera to be used is changed instantaneously and considerably, from among a plurality of events that exist. Therefore, an event that involves such an instantaneous change in camera position may be set such that the microphone switching process is executed in synchronization with the start of the event. That is, when a condition for starting an event in which it is known in advance that an instantaneous change in camera/microphone position occurs is satisfied, it may be determined that the condition for the instantaneous change in microphone position is satisfied, without calculating the actual position change or movement speed of the virtual camera or the virtual microphone.

As for setting of the output level specification table 356 for each virtual microphone, in addition to the above process, for example, data that predefines the contents of the output level specification table 356 for each virtual microphone generation may be used. For example, output level master data having a data structure shown in FIG. 31 may be prepared. The output level master data shown in FIG. 31 is data that predefines the correspondence between sound source generation and initial output level for each virtual microphone generation. When generating the residual microphone and setting the current microphone in the above-described microphone switching preparation process (step S14), such output level master data may be referred to and the output level data 358 may be set according to the generation of each microphone. By using such output level master data, different output levels can be specified for each virtual microphone generation and each sound source generation, respectively, and it is also possible to perform finer adjustment.

In the above embodiment, the example in which the output level of the residual microphone is decreased from "1.0" as the initial value has been described. The present disclosure is not limited thereto, and in another exemplary embodiment, a process of decreasing the output level of the residual microphone from "0.8" as the initial value may be performed.

In the above embodiment, the case where the output level of the residual microphone reaches "0.0" and the output level of the current microphone reaches "1.0" has been described as an example of the condition for completing the microphone switching. That is, control in which the output levels of the respective virtual microphones are gradually changed with "0.0" and "1.0" as target values has been described as an example. In another exemplary embodiment, for example, when the output level of the residual microphone reaches "0.1" and the output level of the current microphone reaches "0.9", the microphone switching may be completed. Furthermore, after that, control in which only the current microphone whose output level is set to "1.0" is used may be performed. That is, when a state where the sound outputted to the speaker 6 is substantially only from the current microphone is brought about, the microphone switching may be completed.

In the above embodiment, the case where the positions of the virtual camera and the virtual microphone are the same, has been illustrated, but in another exemplary embodiment, the positions of the virtual camera and the virtual microphone may be different from each other. For example, the position of the virtual microphone may be the position ahead of the position of the virtual camera by a predetermined distance. Alternatively, the virtual microphone may be provided at the midpoint between the virtual camera and the player character 201. In this case, the position of the virtual microphone can also change as the orientation of the virtual camera changes. Therefore, it may be determined that the above instantaneous change in microphone position has occurred, on the basis of the change speed of the orientation of the virtual camera.

In the above embodiment, as for the determination of an instantaneous change in microphone position, the example based on a change in position before and after one frame has been described, but the present disclosure is not limited thereto. In another exemplary embodiment, when, instead of a change in position before and after one frame, a change in position within several frames to several dozen frames satisfies the predetermined condition, it may be determined that the above-described instantaneous change in microphone position has occurred. In addition to such a change in the position of the virtual microphone, the occurrence of an instantaneous change in microphone position may be determined on the basis of a change in acceleration related to movement of the virtual microphone.

As for the value of the output level, the range of "0.0" to "1.0" has been shown as an example, but other values may be used. Other parameters may be used as appropriate as long as these parameters correspond to the output level.

As for the time for completing the microphone switching, the example in which the microphone switching is completed within the range of 0.1 to 0.8 seconds has been described above. In another exemplary embodiment, the microphone switching may be completed in a time that is outside this range. For example, the case where a representation that two images crossfade is performed as a video representation and the above-described microphone switching process is performed in synchronization with this representation, is assumed. In such a case, the time for completing the crossfade of the images and the time for completing the microphone switching (that is, the crossfade of sounds) may be made the same. Therefore, in such a case, a time of 0.8 seconds or more may be set as the time for completing the microphone switching.

As for the output level in the above embodiment, for example, the output level may be further multiplied by another parameter, and then the volume of the sound to be finally outputted to the speaker 6 may be adjusted. For example, the "basic system (operating system or the like)" that performs basic control of the game apparatus 2 holds a parameter called "first output level", and the output level to be determined in the game processing (game application) described in the above embodiment may be calculated as a "second output level". The final output volume to the speaker 6 may be based on the value obtained by multiplying the "first output level" by the "second output level", for example.

In the above embodiment, the example in which, when crossfading the output levels, the output levels are changed in a complementary manner such that the total of the output levels is constant (the total is "1.0"), has been described. In another exemplary embodiment, the output levels do not necessarily have to be changed in a complementary manner. For example, in order to equalize the auditory sound volume, it is also conceivable to keep the power constant instead of the multiplier. In this case, the output levels can be calculated such that the result of squaring and adding together is "1.0". As an example, at a certain moment, the output level of the residual microphone may be 0.836 (when squared, about 0.7), and the output level of the current microphone may be 0.547 (when squared, about 0.3). Alternatively, for example, in a certain event demonstration scene, a change in the output level of each microphone may be individually set in advance regardless of complementarity.

In the above embodiment, the case where the series of processes according to the game processing are performed in the single game apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A method for controlling a sound outputted from a speaker by game processing, the method comprising:
   - placing one or more virtual sound sources with each of which sound data is associated, in a virtual space;
   - reproducing the sound data of any of the one or more virtual sound sources;
   - moving a virtual microphone in the virtual space;
   - determining that a first condition related to a change in a position of the virtual microphone in the virtual space is satisfied; and when the first condition related to the change in the position of the virtual microphone in the virtual space is satisfied,
placing a residual virtual microphone at a position corresponding to a position of the virtual microphone before the change in the position, and
crossfading the sound outputted from the speaker, from a second output sound based on sound data acquired virtually by the residual virtual microphone from one of the one or more virtual sound sources, to a first output sound based on sound data acquired virtually by the virtual microphone from one of the one or more virtual sound sources.

2. The method according to claim 1, wherein the first condition is satisfied when a parameter related to a movement speed of the virtual microphone in the virtual space becomes equal to or greater than a predetermined value.

3. The method according to claim 1, wherein
the virtual microphone is placed in association with a position and/or an orientation of a virtual camera, and
the first condition is satisfied when a parameter related to a movement speed of the virtual camera becomes equal to or greater than a predetermined value or a parameter related to a change speed of the orientation of the virtual camera becomes equal to or greater than a predetermined value.

4. The method according to claim 1, wherein
the virtual microphone is placed in association with a position and/or an orientation of a virtual camera,
a first virtual camera which is used for reproducing a predetermined scene in which movement of the virtual camera is automatically controlled, and a second virtual camera which is normally used other than for the predetermined scene and whose movement is controlled on the basis of an operation of a user or movement of a player character object are used in the game processing, and
the first condition is satisfied when the virtual camera used for generating a game image to be displayed is switched from the second virtual camera to the first virtual camera.

5. The method according to claim 1, wherein
the virtual microphone is placed in association with a position and/or an orientation of a virtual camera, and
the first condition is satisfied when a predetermined scene in which the virtual camera automatically moves is being reproduced and a preset timing has come.

6. The method according to claim 1, wherein a volume of the second output sound is gradually decreased such that the volume of the second output sound gradually becomes smaller from a volume of a sound set on the basis of a distance between the virtual microphone and the virtual sound source when the first condition is satisfied.

7. The method according to claim 1, wherein, when crossfading, a volume of the first output sound is increased by an amount by which a volume of the second output sound is decreased.

8. The method according to claim 1, wherein the crossfading is performed for a sound based on sound data acquired virtually from the virtual sound source for which reproduction has been performed before the first condition is satisfied.

9. The method according to claim 8, wherein, when the first condition is satisfied, a sound based on sound data acquired virtually from the virtual sound source for which reproduction is performed after the first condition is satisfied is outputted without the crossfading.

10. The method according to claim 8, wherein the residual virtual microphone does not virtually acquire the sound data for the virtual sound source for which reproduction is performed after the first condition is satisfied.

11. The method according to claim 8, wherein, for the virtual sound source for which reproduction is performed after the first condition is satisfied, the sound data acquired virtually by the virtual microphone from said virtual sound source is outputted without the crossfading.

12. A game system comprising:
a memory, and a processor and configured to control a sound outputted from a speaker by game processing by at least:
placing one or more virtual sound sources with each of which sound data is associated, in a virtual space;
reproducing the sound data of any of the one or more virtual sound sources;
moving a virtual microphone in the virtual space; and
when a first condition related to a change in a position of the virtual microphone in the virtual space is satisfied,
placing a residual virtual microphone at a position corresponding to a position of the virtual microphone before the change in the position, and
crossfading the sound outputted from the speaker, from a second output sound based on sound data acquired virtually by the residual virtual microphone from one of the one or more virtual sound sources, to a first output sound based on sound data acquired virtually by the virtual microphone from one of the one or more virtual sound sources.

13. The game system according to claim 12, wherein the first condition is satisfied when a parameter related to a movement speed of the virtual microphone in the virtual space becomes equal to or greater than a predetermined value.

14. The game system according to claim 12, wherein the crossfading is performed for a sound based on sound data acquired virtually from the virtual sound source for which reproduction has been performed before the first condition is satisfied.

15. The game system according to claim 14, wherein, for the virtual sound source for which reproduction is performed after the first condition is satisfied, the sound data acquired virtually by the virtual microphone from said virtual sound source is outputted without the crossfading.

16. A non-transitory computer readable storage medium tangibly storing a game program that, when executed by a processor, is configured to control a sound outputted from a speaker by game processing, by performing operations comprising:
placing one or more virtual sound sources with each of which sound data is associated, in a virtual space;
reproducing the sound data of any of the one or more virtual sound sources;
moving a virtual microphone in the virtual space; and
when a first condition related to a change in a position of the virtual microphone in the virtual space is satisfied,
placing a residual virtual microphone at a position corresponding to a position of the virtual microphone before the change in the position, and
crossfading the sound outputted from the speaker, from a second output sound based on sound data acquired virtually by the residual virtual microphone from one of the one or more virtual sound sources, to a first output sound based on sound data acquired virtually by the virtual microphone from one of the one or more virtual sound sources.

17. The non-transitory computer readable storage medium according to claim 16, wherein the first condition is satisfied when a parameter related to a movement speed of the virtual microphone in the virtual space becomes equal to or greater than a predetermined value.

18. The non-transitory computer readable storage medium according to claim 16, wherein the crossfading is performed for a sound based on sound data acquired virtually from the virtual sound source for which reproduction has been performed before the first condition is satisfied.

19. The non-transitory computer readable storage medium according to claim 18, wherein, for the virtual sound source for which reproduction is performed after the first condition is satisfied, the sound data acquired virtually by the virtual microphone from said virtual sound source is outputted without the crossfading.

* * * * *